(12) United States Patent
Barton et al.

(10) Patent No.: US 12,031,818 B2
(45) Date of Patent: Jul. 9, 2024

(54) SYSTEM AND METHOD FOR MANAGING AND ANALYZING MULTIMEDIA INFORMATION

(71) Applicant: KSI Data Sciences, Inc., Playa Del Rey, CA (US)

(72) Inventors: Jason Barton, Windsor, VA (US); Jon Gaster, Playa Del Rey, CA (US)

(73) Assignee: KSI Data Sciences, Inc.

( * ) Notice: Subject to any disclaimer, the term of this patent is extended or adjusted under 35 U.S.C. 154(b) by 0 days.

(21) Appl. No.: 17/168,993

(22) Filed: Feb. 5, 2021

(65) Prior Publication Data

US 2021/0270606 A1      Sep. 2, 2021

Related U.S. Application Data

(63) Continuation of application No. 14/541,923, filed on Nov. 14, 2014, now Pat. No. 10,942,026.

(Continued)

(51) Int. Cl.
| | |
|---|---|
| *H04N 7/18* | (2006.01) |
| *G01C 11/02* | (2006.01) |
| *G06F 16/44* | (2019.01) |
| *H04L 9/40* | (2022.01) |
| *H04N 1/00* | (2006.01) |

(Continued)

(52) U.S. Cl.
CPC .............. *G01C 11/02* (2013.01); *G06F 16/44* (2019.01); *H04L 63/08* (2013.01); *H04N 1/00204* (2013.01); *H04N 7/181* (2013.01); *H04N 7/185* (2013.01); *G08B 13/19634* (2013.01); *G08B 13/19645* (2013.01); *G08B 13/1965* (2013.01); *G08B 13/1966* (2013.01); *G08B 13/19682* (2013.01); *H04N 2101/00* (2013.01)

(58) Field of Classification Search
None
See application file for complete search history.

(56) References Cited

U.S. PATENT DOCUMENTS

| | | |
|---|---|---|
| 6,509,830 B1 | 1/2003 | Elliott |
| 7,460,148 B1 | 12/2008 | Clark et al. |

(Continued)

FOREIGN PATENT DOCUMENTS

EP    2 495 702 A1    9/2012

*Primary Examiner* — Samuel D Fereja
(74) *Attorney, Agent, or Firm* — Van Dyke Intellectual Property Law; Raymond Van Dyke

(57) ABSTRACT

A UAV data processing and management system is provided including an encoder broadcaster and data manager which provides end users with a single interface for searching and sharing any video or imagery source, from any device with no client software required. Data inputs to the resource can include UAV video, photos, traffic cameras, fixed surveillance systems, iOS and Android device pictures, and other data (e.g., texts, emails) and inputs from all forms of social media, such as Twitter, Instagram, Facebook, etc. The cloud based manager is built with collaboration and sharing in mind while at the same time maintaining data privacy, security protection, chain-of-custody control and audit trail maintenance. Analytic tools are integrated accordingly as "plug-ins" or as a store of available app resources which are easily removed, added and customized based on user needs and system requirements and cost constraints.

23 Claims, 29 Drawing Sheets

Related U.S. Application Data

(60) Provisional application No. 62/057,007, filed on Sep. 29, 2014, provisional application No. 61/904,283, filed on Nov. 14, 2013.

(51) Int. Cl.
 *G08B 13/196* (2006.01)
 *H04N 101/00* (2006.01)

(56) References Cited

U.S. PATENT DOCUMENTS

| | | | |
|---|---|---|---|
| 8,310,361 | B1 | 11/2012 | Stout et al. |
| 2008/0084333 | A1 | 4/2008 | Forrest et al. |
| 2010/0224732 | A1 | 9/2010 | Olson et al. |
| 2010/0293580 | A1 | 11/2010 | Latchman |
| 2011/0046920 | A1* | 2/2011 | Amis .................. G08B 25/016 709/217 |
| 2011/0075990 | A1* | 3/2011 | Eyer .................. H04N 21/4722 386/241 |
| 2011/0103293 | A1* | 5/2011 | Gale .................. H04W 4/06 370/315 |
| 2011/0216179 | A1 | 9/2011 | Dialameh et al. |
| 2012/0169842 | A1* | 7/2012 | Chuang .................. H04N 7/181 348/E7.001 |
| 2012/0237028 | A1* | 9/2012 | Khazan ............. H04W 56/0045 380/201 |
| 2012/0299751 | A1* | 11/2012 | Verna .................. H04B 7/18504 340/945 |
| 2013/0021475 | A1* | 1/2013 | Canant .................... H04N 5/33 348/144 |
| 2013/0050486 | A1* | 2/2013 | Omer .................... H04N 5/232 348/E7.085 |
| 2013/0073775 | A1 | 3/2013 | Wade et al. |
| 2013/0124091 | A1* | 5/2013 | Matas .................... G01C 21/00 715/810 |
| 2013/0144490 | A1 | 6/2013 | Lord et al. |
| 2013/0278631 | A1 | 10/2013 | Border et al. |
| 2015/0142211 | A1* | 5/2015 | Shehata .................. H04W 4/42 701/2 |
| 2015/0266577 | A1 | 9/2015 | Jones et al. |
| 2016/0015290 | A1 | 1/2016 | Kim et al. |

* cited by examiner

Relevant items
from search
results are
dragged and
dropped into the
Items of Interest
box to the right
(labeled Evidence
Locker in this
example). These
items are then
copied if not
already ingested,
stored in the
system and
flagged as
special, then
made available
for analytic tool
processing.
3210

Items
dropped in the
Items of Interest
Box are
automatically fed
to analytic tools
for processing.
The list here
shows all items
dropped into the
Items of Interest
Box (labeled
evidence locker
here) 3204

FIG. 26

SYSTEM AND METHOD FOR MANAGING AND ANALYZING MULTIMEDIA INFORMATION

CROSS-REFERENCE TO RELATED APPLICATIONS

This application is a continuation application of U.S. Application Ser. No. 14/541,923, filed Nov. 14, 2014, which claims the benefit of U.S. Provisional Application No. 61/904,283, filed Nov. 14, 2013, and U.S. Provisional Application No. 62/057,007, filed Sep. 29, 2014, the entire disclosures of which are incorporated by reference herein

FIELD OF THE INVENTION

The present invention relates to unmanned aerial vehicle integration hardware and software system for use in connection with the Internet and mobile networks. The present invention includes an unmanned aerial vehicle encoding streaming device, a software system and an interface which enables an end-user to perform geospatial searches on video and camera feeds from various siloed sources so that immediate data access will become available and analytics, such as rules application, timeline construction, chain of custody and various other parameters, can be easily established.

BACKGROUND OF THE INVENTION

The present invention is derived from projects involving asset management for full motion video (FMV) for film studios and unmanned aerial vehicles (UAV). Some of the UAV issues concern chain of command, chain of custody and auditing data issues.

There is always a need to manage dynamic data streams originating from UAV's. Currently there is a lack of consumer-oriented systems that fuse and manage commercial videos and imagery from UAV's as well as other types of remote sensors. Those sensors can range from the most sophisticated UAV video streams to photos taken with iOS or Android mobile phones and posted on the Internet. Other examples of sensors include ship-based sensors, CCTVs, underwater vehicles, dashboard cameras, wearable cameras, building or home security sensors and Twitter, Instagram, Facebook and smartphone sensor data, to name a few.

There is a further need for an integrated system approach to achieve such management functions with using both low-cost hardware and software.

The hardware device forming the present invention is designed to accept all types of video formats, including HDMI, SDI, analog, digital, component or composite signals to produce a standard h.264 or WebM feed that is ready for viewing on websites. Moreover, the hardware of the present invention would be able to archive the MISP transport stream with key length value (KLV) metadata.

There is also a need to provide a system having a built-in GPS function with an added GPS location element in order that, an-end user would be able to search through their video archive, for example, and see not only where the sensor looked, but where and when the platform sensor navigated through the targeted locations and where the sensor's trip originated from. And there is a further need to provide a system having a flexible archiving function using a standard storage device, such as an SD storage card.

As a consequence, the present invention provides an archive which can provide hours of videos and other data sensor storage. In the event Mobile 4G or LTE is unavailable, for example, the present system would provide a one-click option to upload the archived data along with built-in data management and analytics tools The system further includes built-in WiFi and Ethernet capability to faster local sharing and wide-area network connectivity.

The hardware component of the present invention can also be ruggedized and have battery capability to enable remote operations far removed from a power source.

Additionally, the software system forming part of the present invention is designed to solve in part the problem highlighted in FIG. 1.

FIG. 1 is an aerial photo of a crime scene where a trailer 101, originally parked next to a building, was stolen. Police had no idea when or how it was stolen. The reason that police had no data was that they had no access to relevant security camera information. That data is instead effectively stuck in various isolated silos as shown in FIG. 2.

Specifically, in FIG. 2, the trailer target viewing area 101 has at least ten potential camera feed resources 401-410—all of which could have been integrated at the time the police report came in, and available at the officer's "finger-tips" as investigative resources to assist in pursuing the trailer thief.

One method to unlock siloed information resources is to provide the end user with an integrated interface, much in the same fashion that Internet data is gathered in a convenient manner. As a consequence, input information or such as UAV video feed can be viewed, analyzed and stored in a user-friendly manner.

The foregoing and other objects, features and advantages of the invention will be apparent from the following more particular descriptions of exemplary embodiments of the invention as illustrated in the accompanying drawings wherein like reference numbers generally represent like parts or exemplary embodiments of the invention.

BRIEF DESCRIPTION OF THE DRAWINGS

FIG. 10 is a screen-shot of an Internet web page (hereinafter "screen shot") of the graphic user interface produced from an integrated server executing manager 350;

FIG. 13 is a screen-shot of the of the map imaging feature of the manager 350;

FIG. 17 is a graphic user interface screen shot of another map search of an urban area;

FIG. 26 is a graphic user interface screen shot of the manager timeline function;

DETAILED DESCRIPTION OF THE PREFERRED EMBODIMENTS

Figure 3:
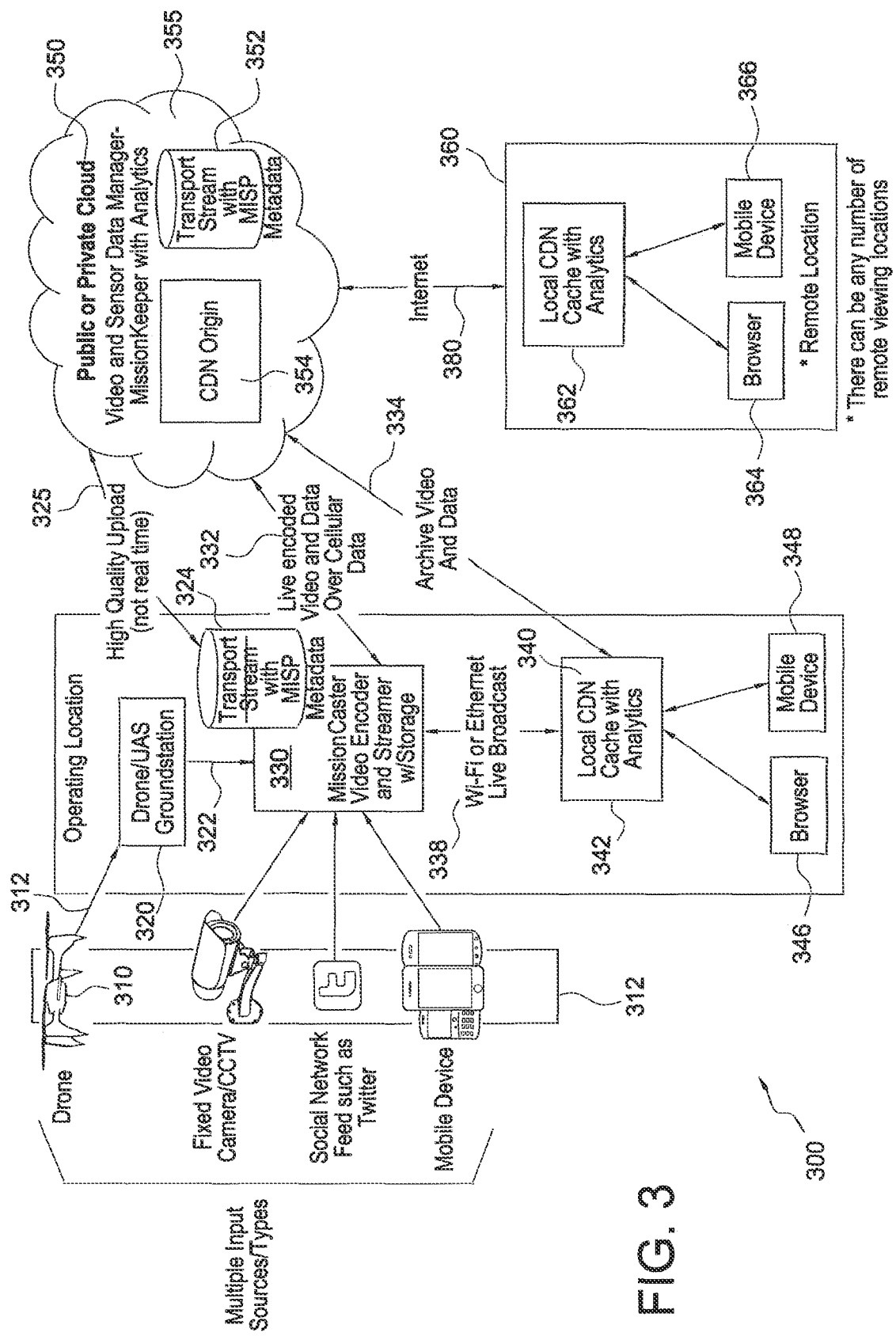
FIG. 3 is a block flow diagram of the elements of the present invention.

FIG. 3 is a flow block diagram of the elements of the present system 300. As shown, the system 300 receives a variety of inputs 312, including those from UAV 310. The sensor data 312 includes telemetry in standardized and/or non-standardized format with analog or digital video. Aside from a UAV, input 312 can include social media feed, mobile device data, imagery or other sensor data. An unmanned aircraft system (UAS) ground station 320 receives the UAV payload 312 and in turn outputs video and sensor data 320 to a video encoder broadcaster device having storage capacity 330. Further details concerning the current design and functions of the encoder broadcaster 330 are set forth in FIG. 4. In operation the encoder/broadcaster receives the video feed 322 from the UAS ground station 320 with either synchronous or asynchronous sensor data/telemetry and video 322. Unit 330 then encodes the analog video signal and/or transcodes the digital video signal to a motion imagery standards profile (MISP) compliant stream. The MISP compliant stream is also embedded by the encoder with KLV metadata.

The encoder broadcaster 330 performs three simultaneous operations. First, it delivers live encoded video to a local data cache 340 with analytics via WiFi or through an ethernet connection 338. The local cache 340 in turn stores the live encoded data with affiliated analytics 342 as selected by the user.

Second, the local cache 340 provides data to a browser 346 and/or to a mobile device(s) 348 for access, analysis or other use. The encoder/broadcaster 330 also delivers live videos to the cloud or other appliances 350 through a cellular data link 332. In a preferred embodiment, the cellular data link would be encrypted.

Third, the encoder/broadcaster 330 streams or writes a higher quality version of the video/data feed to internal storage via link 325 for purposes of facilitating higher quality uploads through cloud storage, such as a long term storage archive 352. The archived data also provides data to the local cache 342 or a memory in the origin content delivery network (CDN) 354 and/or the remote CDN 360.

The encoder broadcasted live feeds 332 or archived encoded feeds 334 can be provided to any video processing application or tools on the origin CDN 354 or any other local or remote CDN's 340 or 360. In a preferred embodiment, the video data is provided to the video and sensor data manager 350 that operates on an integrated server located in the cloud 355 origin CDN 354 and that includes analytic functions, and single-click uploads for an operator through a web-based interface.

Finally the existing landline or Internet network can interact with the cloud-based manager 350 for local operations; for example, through a remote operations center 360. Data can be stored 362 or passed to appropriate workstations or servers 364 via a browser or be passed to mobile unit or units 366.

Figure 4:
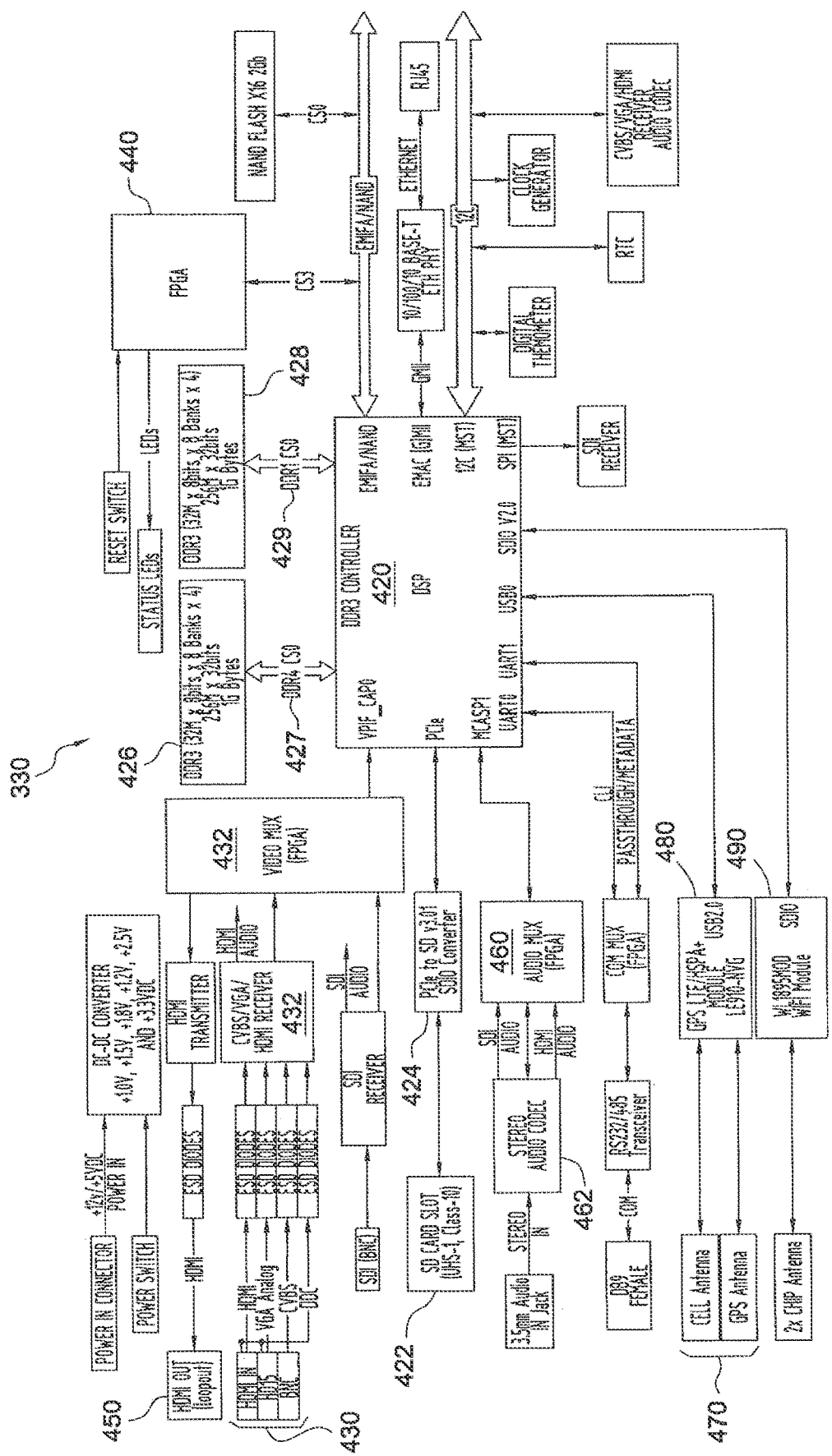
FIG. 4 is a circuit diagram of the encoder broadcaster 330.

FIG. 4 is a circuit layout diagram of the encoder/broadcaster device 330. The main signal processor DSP 420 is connected to the input channels to receive HDMI data 430,432 via a video multiplexor chip 432, GPS and cellular data 470 via module 480 and WiFi input through the WiFi module 490. SDI and HDMI audio are processed through the stereo audio codec and audio multiplexor chips 460, 462. The audio input stream is primarily used to listen to UAV engine noise, although it can be applied to other applications as well (e.g., boat motor noise, underwater vehicle propeller noise; and user chat from mobile devices). The DSP processor 420 works with dual DDR-RAM chips 426 and 428 via paired buses 427,429. Additionally, the DSP is controlled by the field-programmable gate array 440 (FPGA) which executes logical functions such as on-the-fly encode/decode, data archiving and signal packetization and encapsulation.

The video encoding features include single channel HD and SD encoding. For HD, the encoder handles HD-SDI, HDMI and VGA formats along with HDMI pass-through. SD inputs include composite analog (NTSC/PAL), SD-SDI. The encoder produces both a transport stream (in NGA-approved MISP format) and an elementary stream (H. 264). The elementary stream, which is live, is delivered to the Internet cloud 355 in near real-time via an encrypted cellular data connection 332 (FIG. 3). The encoder 350 also delivers the live elementary stream data to local users via WiFi or Ethernet 338 (FIG. 3) in near real time. The encoder archives an AES 256 bit, encryption, high quality (full resolution metadata) transport stream in NGA approved MISP format at 324 (FIG. 3) and to the SD card 422 (along with converter 424). The SD card is removable and the archived contents can later be published to the video sensor manager 350, or elsewhere as desired.

The encoder/broadcaster 330 therefore avoids many of the drawbacks of existing systems.

Figure 8:
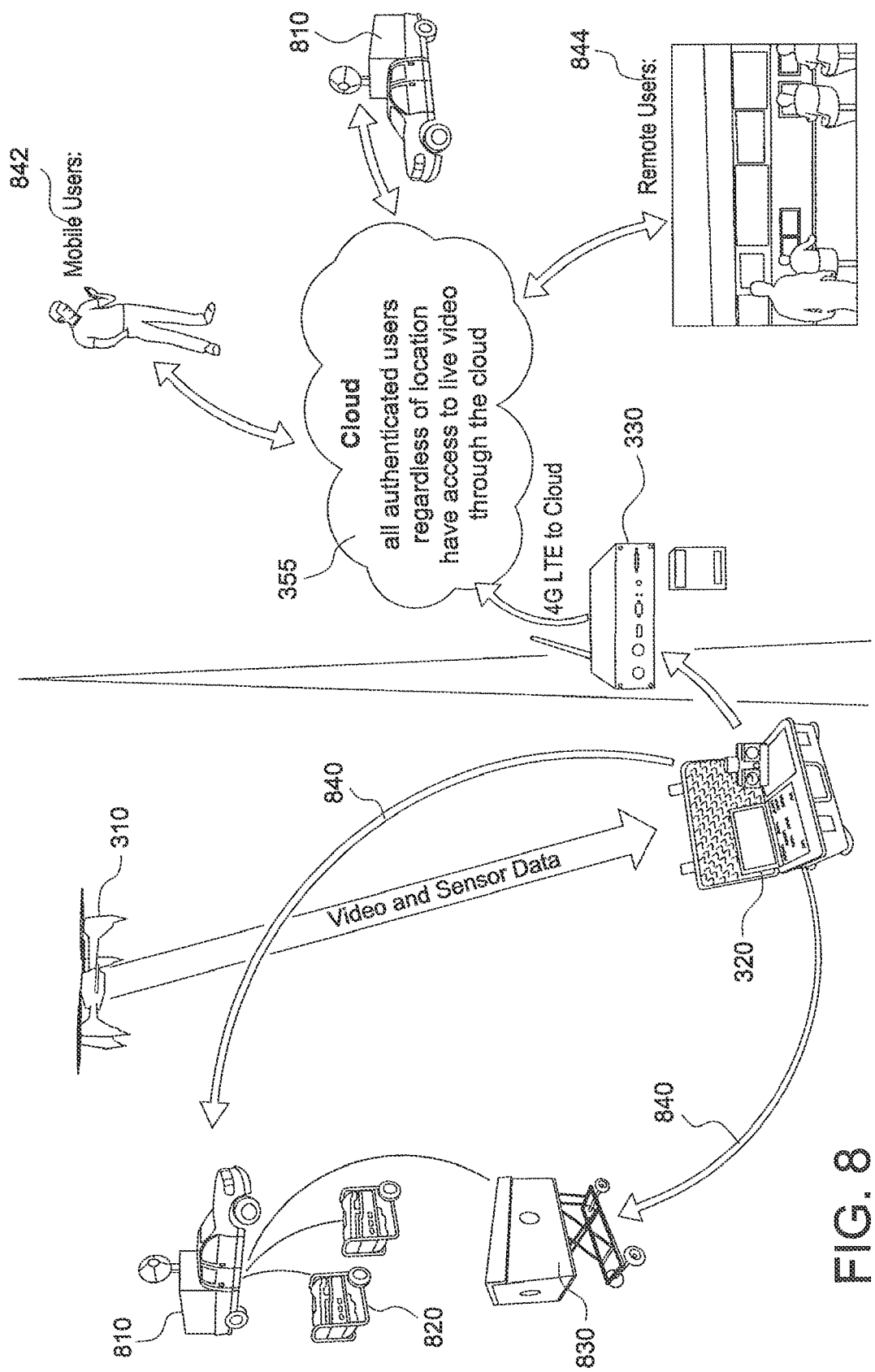
FIG. 8 illustrates improvements provided by the present invention as deployed in connection with a UAS ground station 320.

As shown on the right side of FIG. 8, an emergency vehicle 810 is not needed to park in the vicinity since the encoder/broadcaster 330 does not require a generator 820 (shown on the left side of FIG. 8 depicting the system without encoder 330) for power. There is also no need to deploy an equipment cart 830 with typical UAV components, such as an ROV, ground robots, a ground station, a network switch, a WiFi access point and HDTV, all of which must be tethered to the power source 820. Another drawback resolved by the encoder/broadcaster 330 is providing connectivity since generally there is no way to get the video out of the ground station 320 to someplace useful, such as the truck 810, the cart 830 or the cloud 355 (lack of connectivity is symbolized by broken lines 840).

By contrast, and as shown on the right side of FIG. 8, the encoder/broadcaster 330 provides access to live video to all authenticated users 842, 844, regardless of location-via the Internet cloud 355. Thus, remote computer users 844 can access video through the cloud 355. Mobile phone users 842 can in turn access the video directly from the cloud or from WiFi 338 or 366 if they are located close enough to be within the WiFi hot zone. Moreover, users have access to both active and live video.

Figure 5:
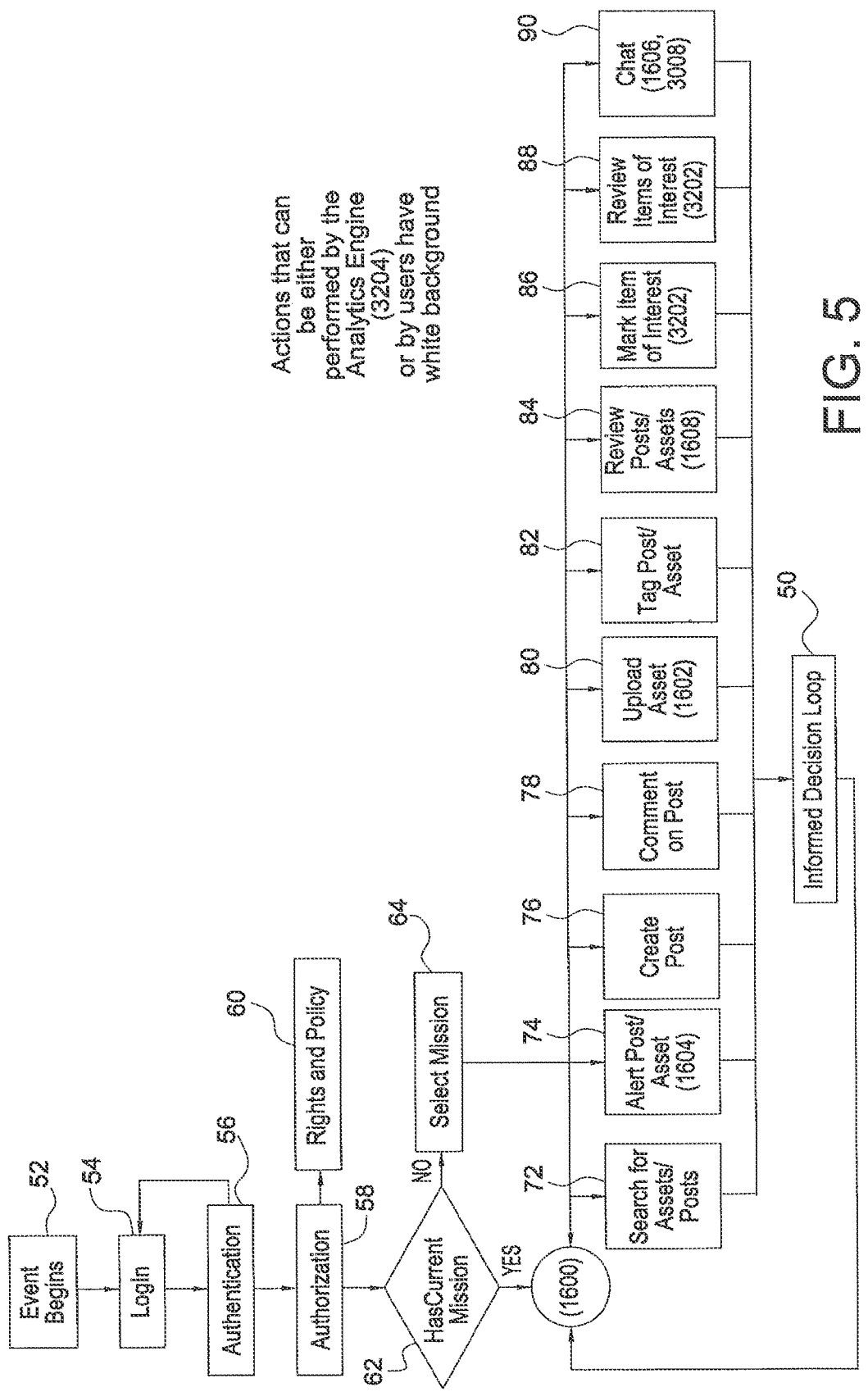
FIG. 5 is a flow chart of the informed decision loop used in conjunction with manager 350.

Certain manager operations 350 will now be described in detail in connection with FIG. 5.

The manager 350 presents users, such as first responders, with a collaboration tool, reports and workflows that support an informed decision loop 50. Those users are typically logged in following an event initiation 52, through a login step 54, user authentication 56, and user data access authorization 58 pursuant to system level rights and policies 60. These steps can be implemented using processes and tools available to one of ordinary skill.

An authorized user is then queried regarding the mission type 62 and then selects a mission 64 if their answer is "no". The user then enters the decision loop 50.

Emergency response is a collaborative and iterative activity. New information is constantly coming in. Individuals and teams are continually analyzing that information and sharing that analysis with others. Those receiving new information and analysis respond to it, which can trigger new information and additional responses. At every moment in this ongoing cycle, teams and individuals use manager 350 to stay informed and communicate new information. This happens inside the informed decision loop 50. That loop includes searching for assets/posts 72, posting an alert or an alert asset 74, creating a post for others to review 76, commenting on posts of others 78, and uploading an asset 80. Individuals can also review posts/assets 84, mark items of interest 86, review items of interest 88 and chat through the GUI 90. Individuals decide their next action from a number of options. Through that action they or others become more informed and that drives additional decisions and additional actions.

Figure 6:
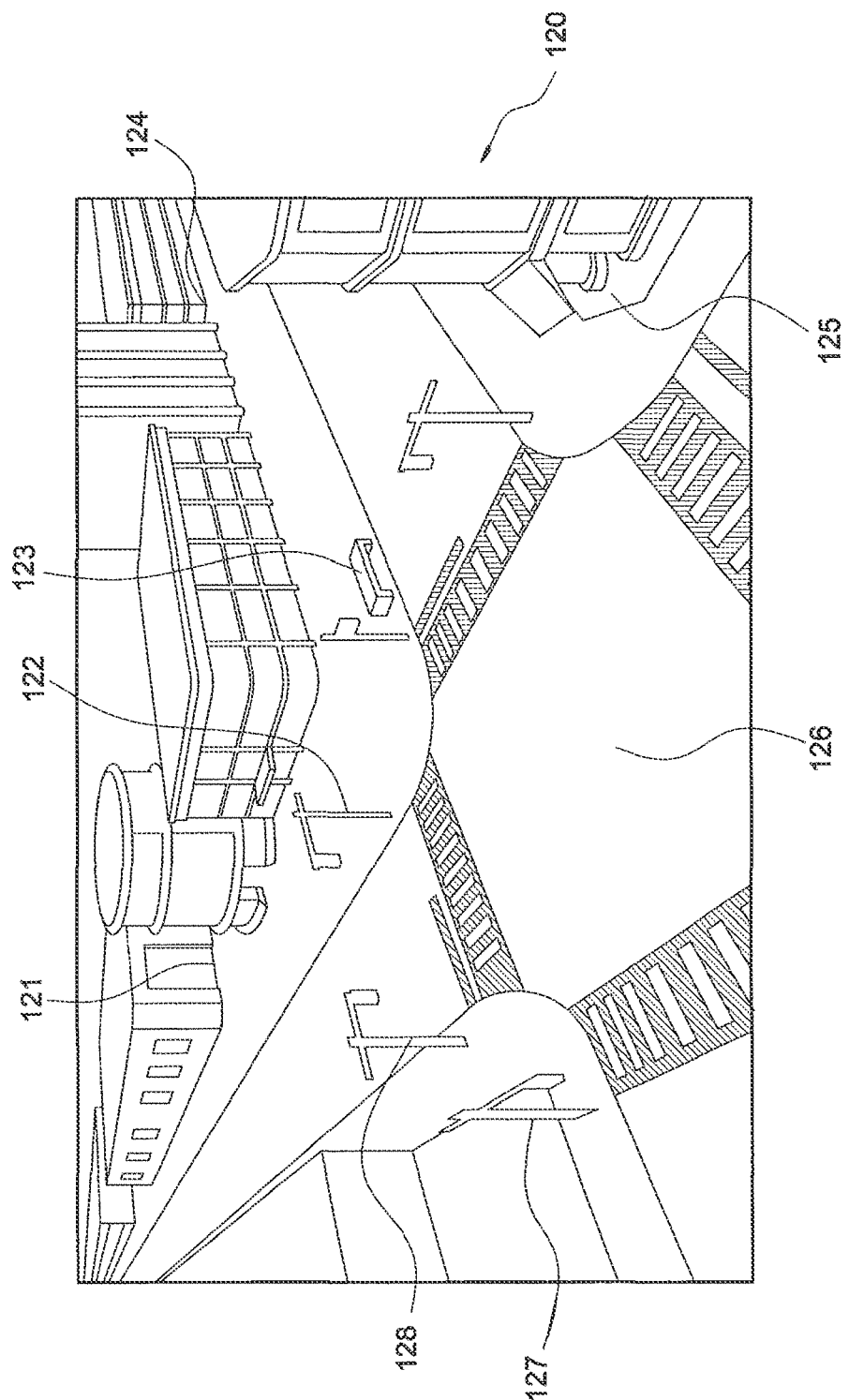
FIG. 6 is an example of the camera field of use setting function used in the present invention.

FIG. 6 illustrates the method for determining the field of view 120 of a camera which forms the basis of location based search for fixed cameras.

During the camera registration process which is controlled by the manager 350, GPS coordinates will be collected for the camera and some number of fixed objects in the field of view 120 of the camera. As shown in FIG. 6, a number of objects 121-128 are registered in the field of view 120. The collected coordinates 121-128 will be fed into an algorithm that creates a calculable "grid" of GPS coordinates within each camera's respective field of view 120. The system will have data for where all the registered cameras are looking, the fixed camera/cctv system knows time, when combined, a user can search based on time and location, the system will then only search the relevant camera recordings.

Figure 7:
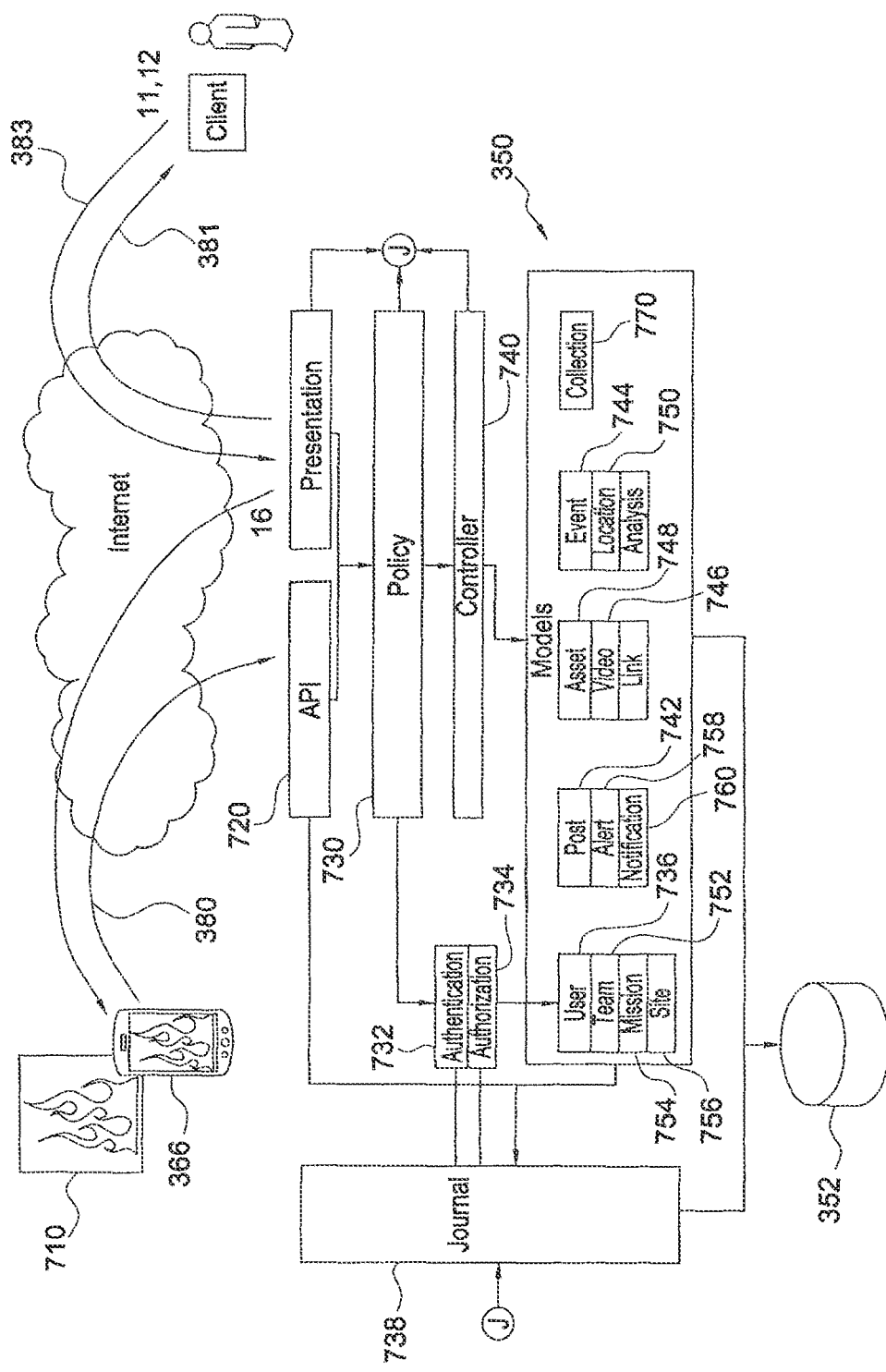
FIG. 7 is a block flow diagram of the units comprising manager 350.

FIG. 7 is a block flow diagram illustrating units of the manager 350. Each unit can comprise a separate functional unit, such as a dedicated processor, or a software module installed on integrated server 354 as part of the origin CDN located on the Internet. As shown in FIG. 3, the integrated server can be part of a public or private cloud network 355 accessible to local and remote users alike as is conventionally known in the art. Other operations of the manager 350 are further described below.

An end user accessing their remote mobile device 366 communicates an event happening in their vicinity 710. In this scenario, a photo of a fire 710 is captured in the field by a first responder who forwards text, image or video to manager 350 through the Internet or their cellular phone network 380. The message is received by the manager 350 as a secure SSL encrypted JSON call from the first responder's mobile client 366 to the API 720. The received input is then validated against all applicable policies of the manager. In the present embodiment, those policies include authentication 732 and authorization 734. Authentication and authorization may use a common user model or profile 736. The user model retrieves data from storage 352 to load properties about the user that the authentication 732 and authorization 734 policies can use to approve or reject access and behavior. These policies can reflect a number of norms, such as HIPAA requirements in hospital settings, police security, military security and corporate security, fire departments or other emergency responders, to name a few.

All actions up to this point and all subsequent actions are modeled as journal 738 instances and are also saved to storage 352. After passing all policies 730, the manager 360 begins to implement the action of receiving the first responder's event to the controller unit 740. Specifically, the controller 740 loads and saves information via various models. In this case the first responder's post has automatically created a post 742, event 744, video 746, location 750 and an asset 748, along with numerous journal 738 instances. Several of these model instances are associated with the first responder's user 736 instance and the instances associated with the user's current team 752, mission 754 and site 756. All of this is saved to storage 352 as new documents or files or folders, one document per model. Associations are saved in each model instance on both sides of the association. Further, the controller 740 causes a message 381 to be sent to all clients subscribed to any of the model instances. This happens as encrypted communication over a TCP/IP socket through the Internet 380, or locally 338.

Clients, for example, receiving a notification of one or more model changes will update their user experience settings (UX) to show the new information associated with the changed model. They do this by making a secure HTTP call to the presentation service (not shown) as is conventionally known in the art, which renders the UX for display on the client's device. In this example, a worker in an operations center sees a new post from the first responder's mobile device 366. The worker marks the new post as a high priority alert. This sends a message back 383 via the Internet 380 or locally 338 to the manager 350. The message goes through all the required policy checks 730 as described above. After passing the policy checks, the controller 740 begins to implement the alert. An instance of an alert model 758 is created and associated with the post instance created by the first responder 366. This is saved to storage 352. A notification instance 760 is also created. Finally, clients that are subscribed to either alerts 758 or notifications 760 are notified and update their UX accordingly and the first responder 366 sees a notification of the alert 758. Collections are arbitrary groups of model instances. These can be used to bring together disparate videos, images, posts alerts, etc for any use. A collection 770 is designated as either being updatable or not updateable. Collections 770 that are not updateable can accept the addition of new model instances.

Once added these instances are copied into the collection 770 along with a copy of all records of access and all previous versions of the instance. The copied data is durable and will never change again. Once copied into the collection 770 the Model instance can never be removed. As a result collections that are not updatable can be used to preserve a chain of custody for evidence.

Instances of analysis models represent results of secondary analysis upon other model instances. For example, a facial recognition analysis service could analyze the video data related to a number of video model instances. For each video model instance in which a face was identified the analysis service could save a corresponding analysis model instance referring to the video model instance. It could additionally save one analysis model instance as a record of its operation and parameters. A link model instance is used to record the location of a web URI e.g. a twitter post.

Figure 1:
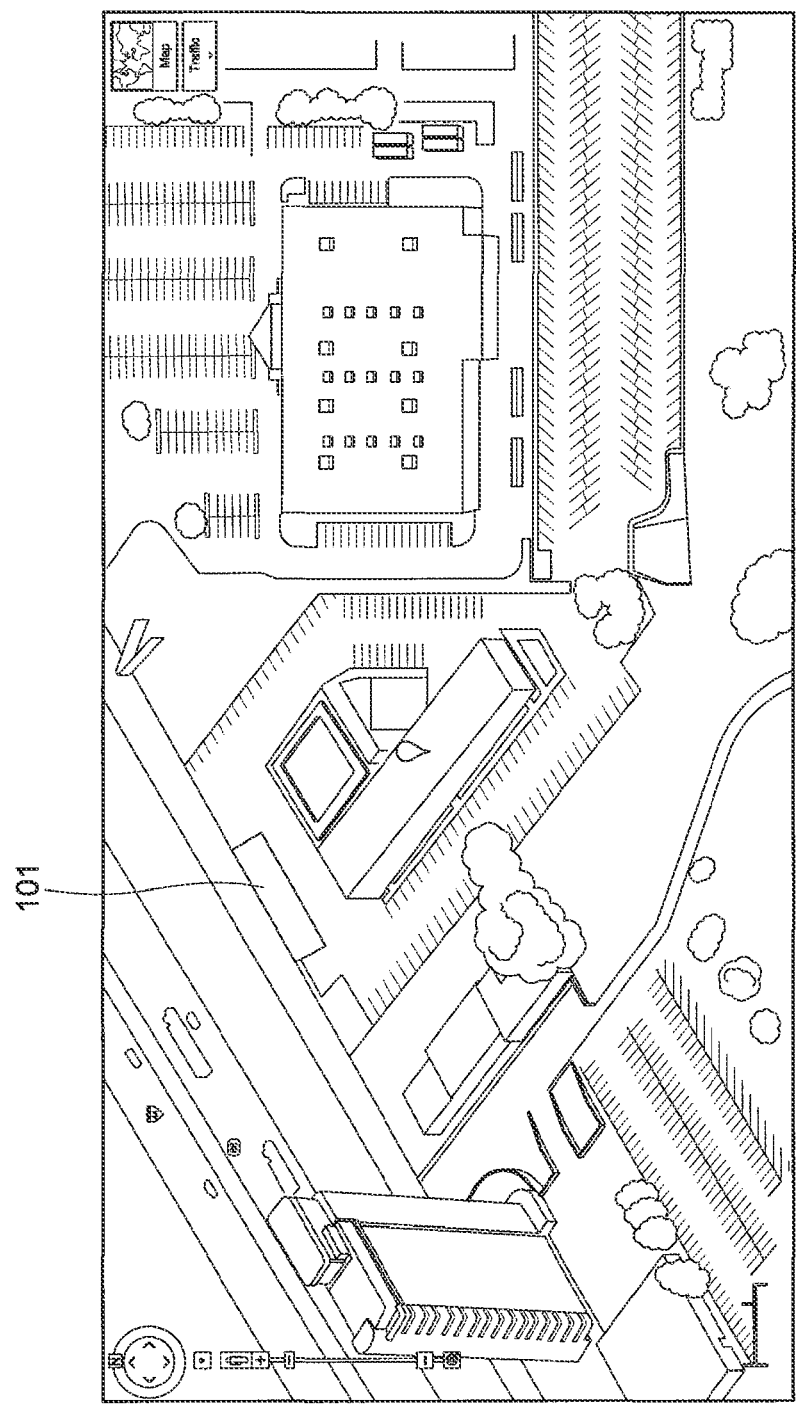
FIG. 1 is an aerial photo showing the location of the stolen vehicle.
Figure 2:
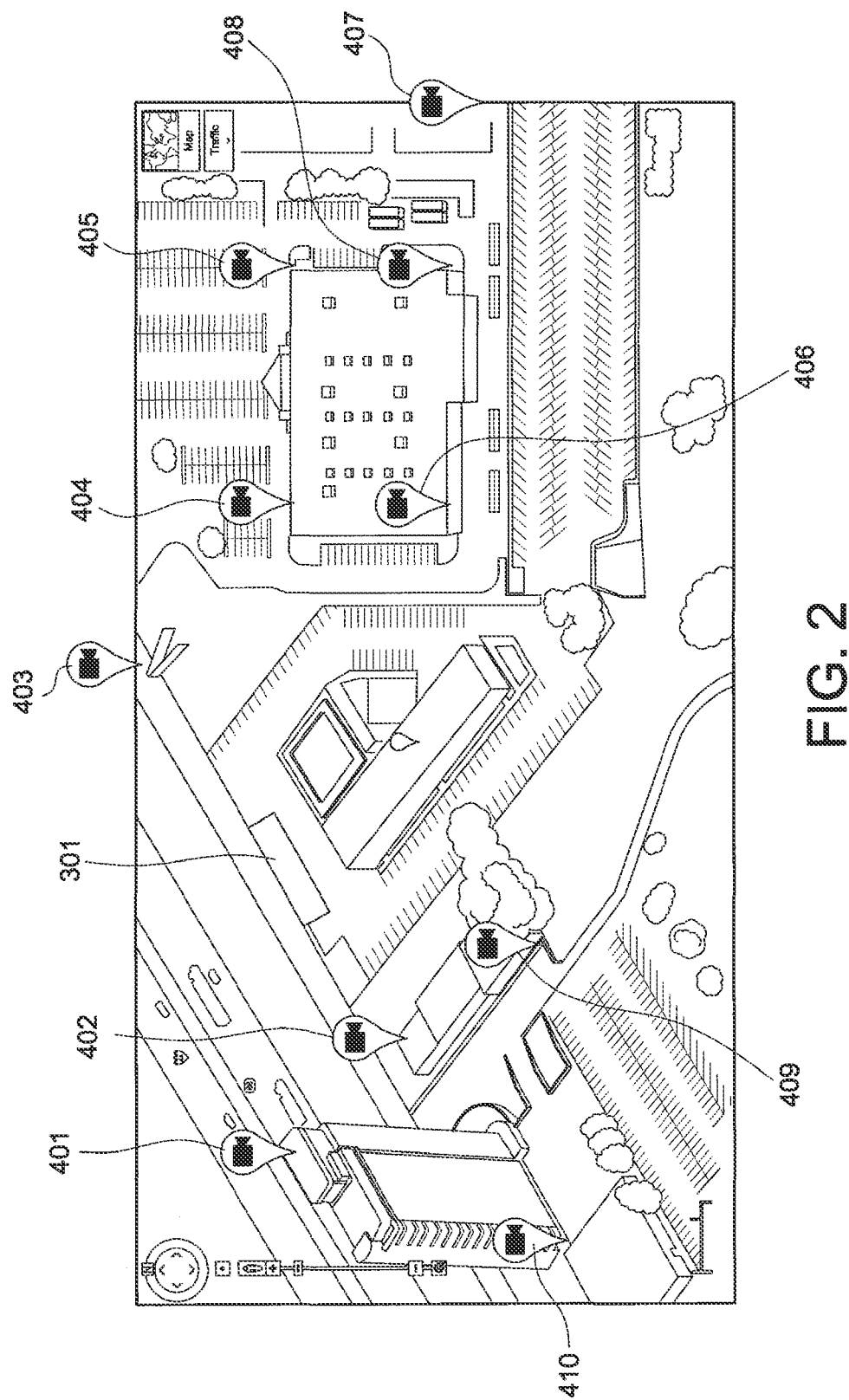
FIG. 2 is an aerial photo showing the locations of siloed video cameras in the vicinity of the stolen vehicle.
Figure 9:
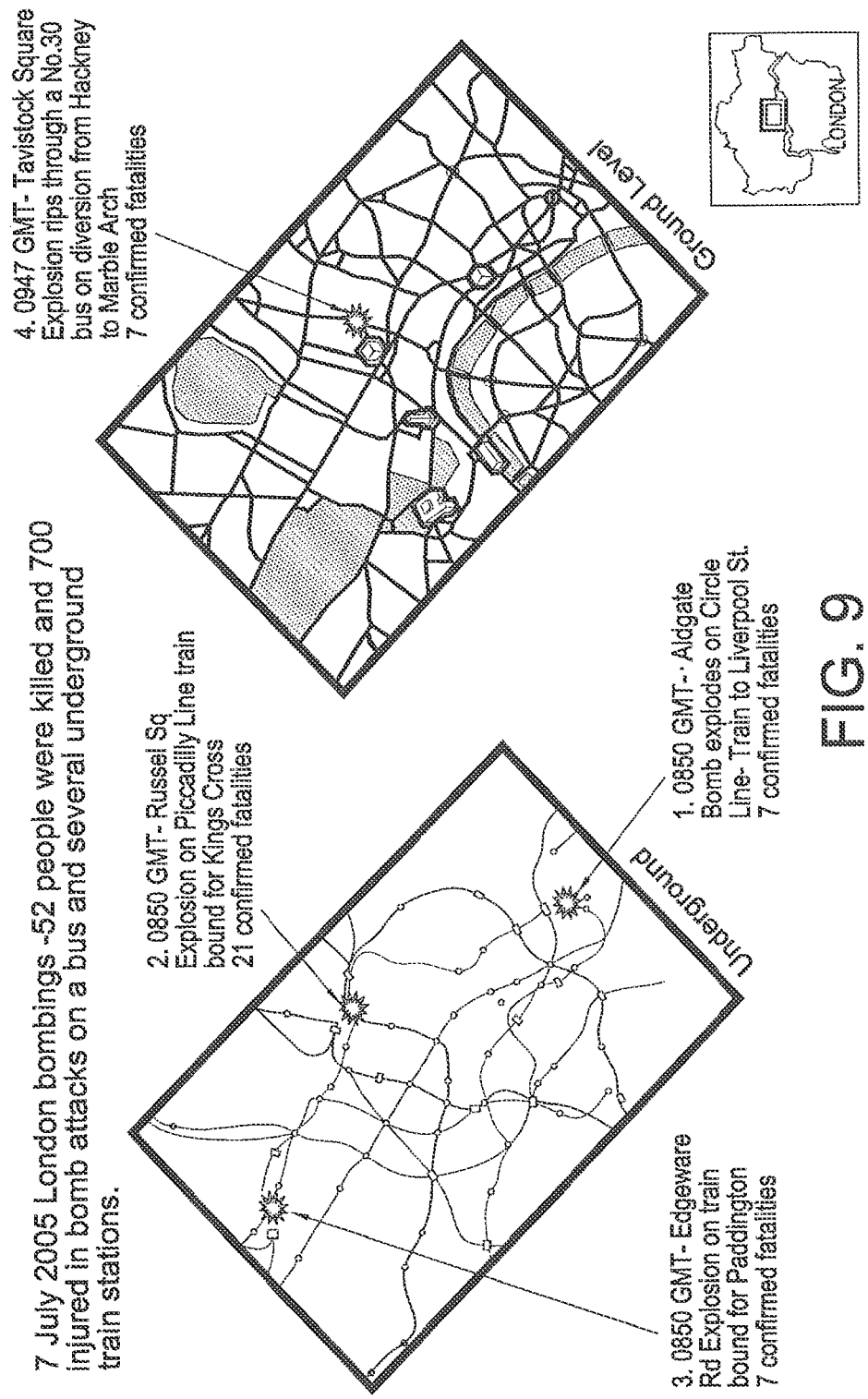
FIG. 9 illustrates map locations of the London terrorist bombings.

In FIG. 9, the advantages of the manager system 350 will now be described. As previously noted in connection with FIG. 2, when police began investigating the stolen trailer, they uncovered the multiple camera sources 401-410 in the robbery vicinity. However, the data for those manager resources was stored in ways that made it very difficult to gain access and use the data.

First, a lot of the data was recorded on rolling tape or resided in the memory of each camera's dedicated digital video recorders (DVR's). Obtaining such data therefore takes itself a lot of time to gather since it involves taking physical possession of each tape or the DVR unit itself.

Second, the data cannot be integrated with software analytic tools without time consuming analog to digital conversion. Also, these storage formats do not allow geo-spatial searching since a significant portion of the data lacks telemetry information.

FIG. 9 illustrates another example of the need for the system in connection with the Jul. 7, 2005—London bus bombings. Investigators could not use surveillance or camera data monitoring even though YouTube was an available web-based resource at the time. That is because YouTube is limited to video input, its data is not searchable, and it cannot handle live feed content. Instead, FIG. 9 reconstructs the London bombings events which involved detonated backpacks (like the 2013 Boston Marathon bombing). However, London investigators had to pull hard drives located all over London in order for them to reconstruct a video record of data.

As a result of the London bombing and other tragedies like the Boston Marathon bombing, there is a significant need not only for the data encoder as shown in FIG. 4, but for a software based manager that integrates all data sources automatically within the context of a "story line". Moreover, there is a need for such a resource to reside in the Internet cloud in order that different users can gain quick and easy access to that data. Unlike London, today all of the infrastructure exists and is more quickly accessible as proven in Boston's case.

There is also a need for a single interface for searching and sharing any video or imagery source, from any device with no client software required. Data inputs to the resource can include UAV video, photos, traffic cameras, fixed surveillance systems, iOS and Android device pictures, and other data (e.g., texts, emails) and inputs from all forms of social media, such as Twitter, Instagram, Facebook, etc.

The cloud based manager 350 (FIG. 3) is built with collaboration and sharing in mind while at the same time maintaining data privacy, security protection, chain-of-custody control and audit trail maintenance. Analytic tools are integrated accordingly as "plug-ins" or as a store of available app resources which are easily removed, added and customized based on user needs and system requirements and cost constraints.

The present cloud-based manager 350 allows nuggets of data to be accessible and includes private data which is protected appropriately. Dynamic monitoring could occur with an appropriate set of laws applied to the data. For example, various territorially specific privacy laws could be applied to a geo-spatially mapped UAV input stream, so that access privileges can be dynamically shifted, such as when the UAV camera feed goes across a state or international border. The system creates a user friendly way to define the various rules and laws due to its geo-mapping and data coordination capabilities.

While the present manager is rule agnostic, it provides an applications programming interface for privacy, chain of custody and auditing rules to be set by users, such as police, national security agencies or commercial customers with special privacy needs (e.g., ambulance systems that are concerned about patient privacy under HIPAA).

For example, there is a new market for UAV data that is non-military based. Recently the Federal Aviation Administration has allowed UAV flights over the United States. Outputs from UAV's could provide important resources for the present invention. Also as noted in FIG. 3, the present invention 330 can process fixed surveillance data, twitter data and outputs from iOS and Android devices. But the UAV case is compelling since there is presently no commercial platform for UAV data. By creating a UAV data management, monitoring and analytics platforms 350, important data can be leveraged into the Internet cloud which could dramatically reduce manpower management needs. By definition, the present invention solves a big data problem with available technology—allowing users to sift through huge amounts of data efficiently and applying many available analytical tools to the data with ease. Said another way, too much information is the same as not having enough information. Currently systems are overwhelmed with data. Analysis of real-time surveillance becomes burdensome, time consuming, and hampers timely investigation and action.

UAV's in the US alone generate twenty-four years' worth of video each year, if watched continuously. And, newer UAV models are expected to produce thirty times as much information in 2012 alone.

Moreover, the new UAV resource necessarily is a security issue. Data privacy, protection, chain-of-custody (sharing), data-at-rest, data in transmission—all have different auditing needs and legal ramifications. As a consequence of the myriad of legal issues, some UAV users are simply not recording data at all. For these users, the UAV, as a data resource, becomes a nullity. For example, some users are worried that the UAV data will become an evidentiary issue and possibly "poison" a case; also auditing would be needed for FOIA requests. Presently, users cannot even determine if the UAV was even set to "not record".

The market to help resolve these legal challenges is substantial. Users include first responders, precision agriculture, utility inspection, real estate, construction, protected area management, transportation infrastructure, as well as security and policing, to name a few.

Currently, there are a number of applications, none of which provide the advantages and features of the present manager 350. Applications exist in Evernote, Skitch, Facebook, Dropbox, Twitter, Netflix, and Google Instant. Evernote, for example, provides a geo-spatial note and brainstorming tool; Skitch provides an app that is like a John Madden sketch over content (annotation and mark-up tool).

Figure 10:
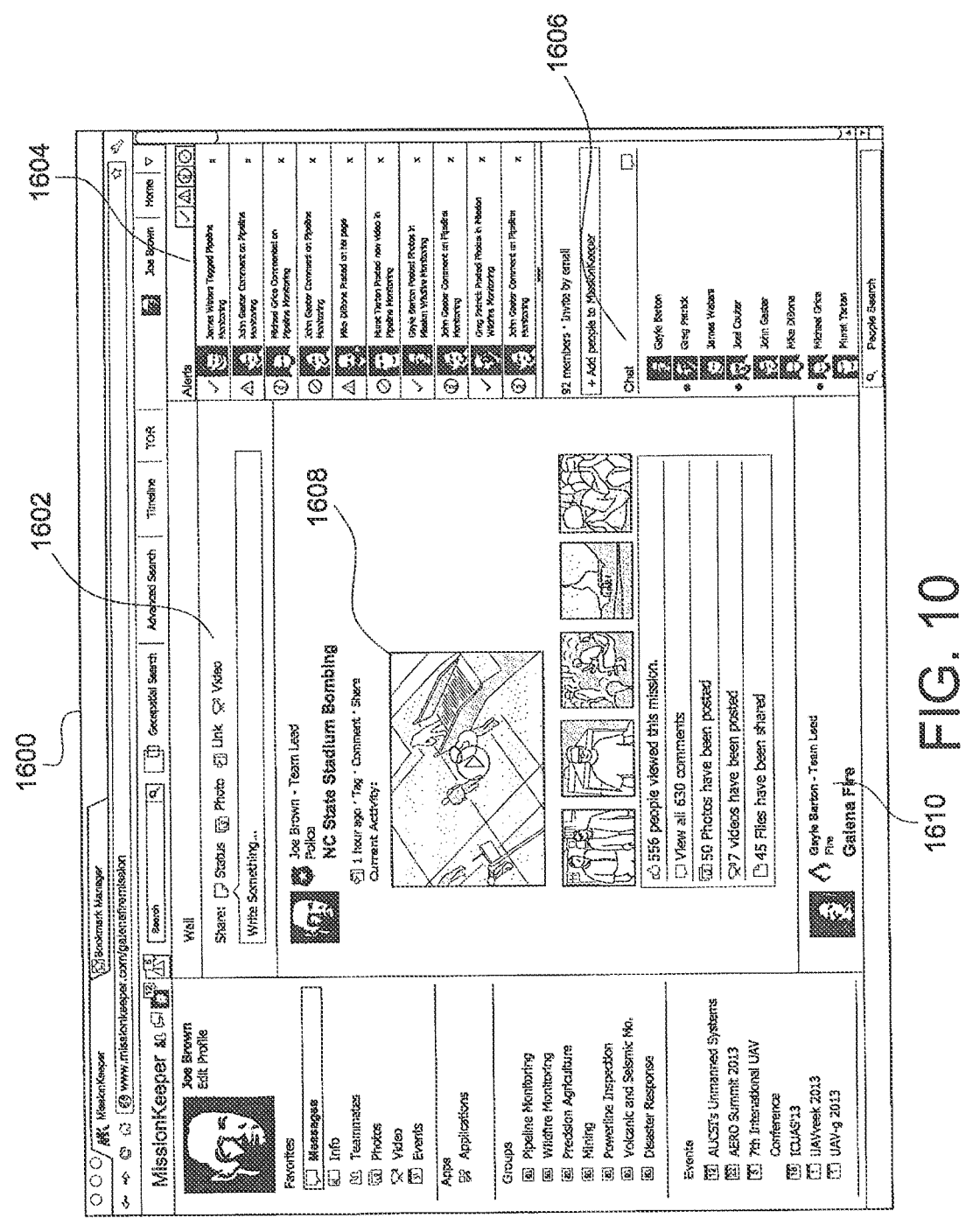

FIG. 10 is a screen-shot of the graphic user interface 1600 of manager 350 which provides an events wall 1602 for management, access, monitoring and coordination of all data. The GUI which is provided as a web page from integrated servers in the CDN origin includes multiple collaboration areas, such as a page portion for sharing data alerts 1604 and instantaneous online chats 1606. An example of an application of the GUI is described below. Data for the GUI is processed, and stored in accordance with the system diagram set forth in FIG. 3.

The events wall 1602 enables an end-user to display on his/her browser (346, 364) or mobile device (348, 366) all active and past "missions" (as will be described below in more detail) in which the user has participated. As new information is recorded, retrieved or otherwise learned about and shared, updates are posted on the wall 1602 as communicated to the user via the CDN origin via the Internet 380 or through a local WiFi connection 338. In essence, an end user is given the ability to post everything on the wall.

FIG. 10 exemplifies a forest fire mission which is shown in various views on the events wall 1608. Alerts relating to the mission are color-coded on the right hand portion of the GUI 1604, so that all alerts regarding the "Galena wildfire" are easily found. A separate mission regarding "pipeline monitoring" is also posted on the events wall 1604 in a different color. Again, alerts, regarding the separate mission are color-coded on the alerts wall 1604.

Figure 11:
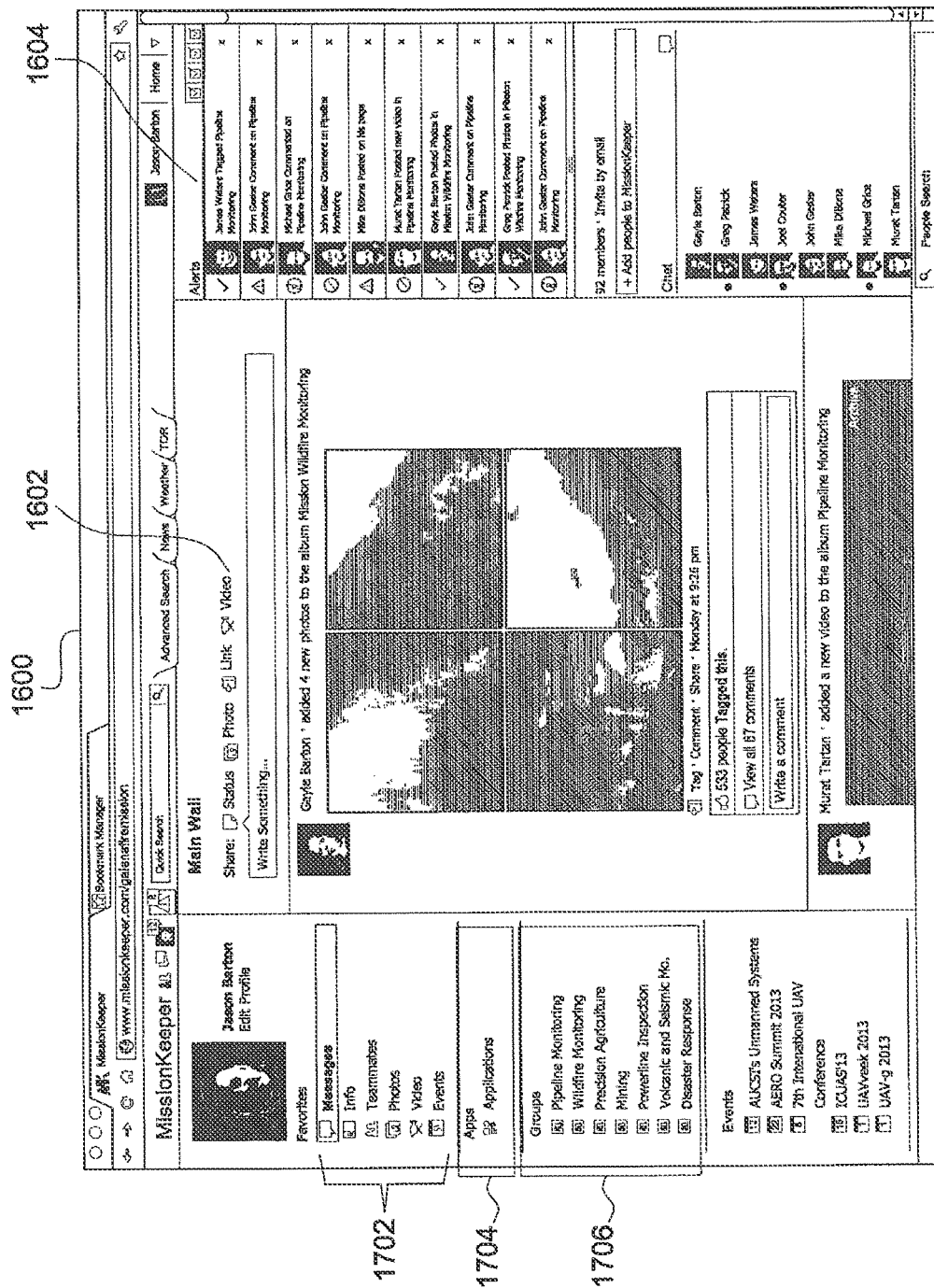
FIG. 11 is a screen-shot of the graphic user interface displaying data types from the events wall.

FIG. 11 is a screen-shot of the GUI displaying data types from the events wall. The left side of the GUI 1600 shows the types of data that can be specified on the GUI 1602. The data types include messages, "info", teammates, photos, videos and events 1702. Section 1704 charts third party applications reporting and analytics data and tools.

GUI Section 1706 displays a list of mission groups covered by the manager 350. Those groups are available to the end user depending on that user's respective security level access in the manager 350. The present user has access to all mission groups which include pipeline monitoring, wildfire monitoring, precision agriculture, mining, power line inspection, volcanic and seismic monitoring and disaster response.

Alerts 1604 are only about the highlighted mission being monitored.

Figure 12:
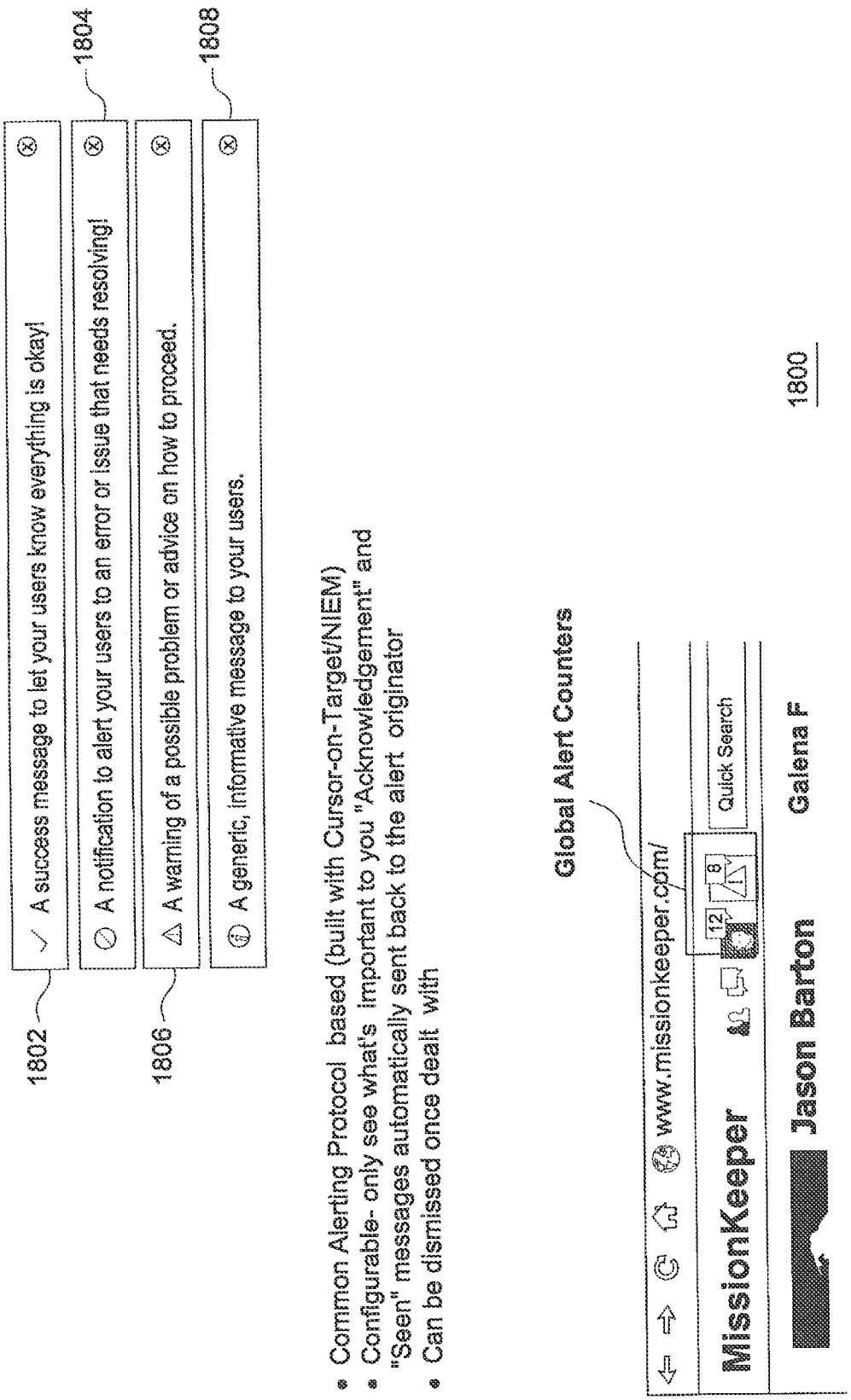
FIG. 12 is a screen-shot of the graphic user interface alert fitter function.

FIG. 12 is a screen-shot of the alert filter GUI 1800. As shown, alerts can be filtered by color and relate to a common alerting protocol in order that the end-user sees only what is important. As shown, a green Alert 1802 means that the mission status is OK; a red Alert 1804 indicates that an issue needs attention and requires action; a yellow Alert 1806 is a warning signal of a possible problem and requires advice on how to proceed and a blue Alert 1808 is a generic information message sent to users about a mission situation. However, any Alerting protocol can be deployed by the system administrator to enable efficient use of data.

Figure 13:
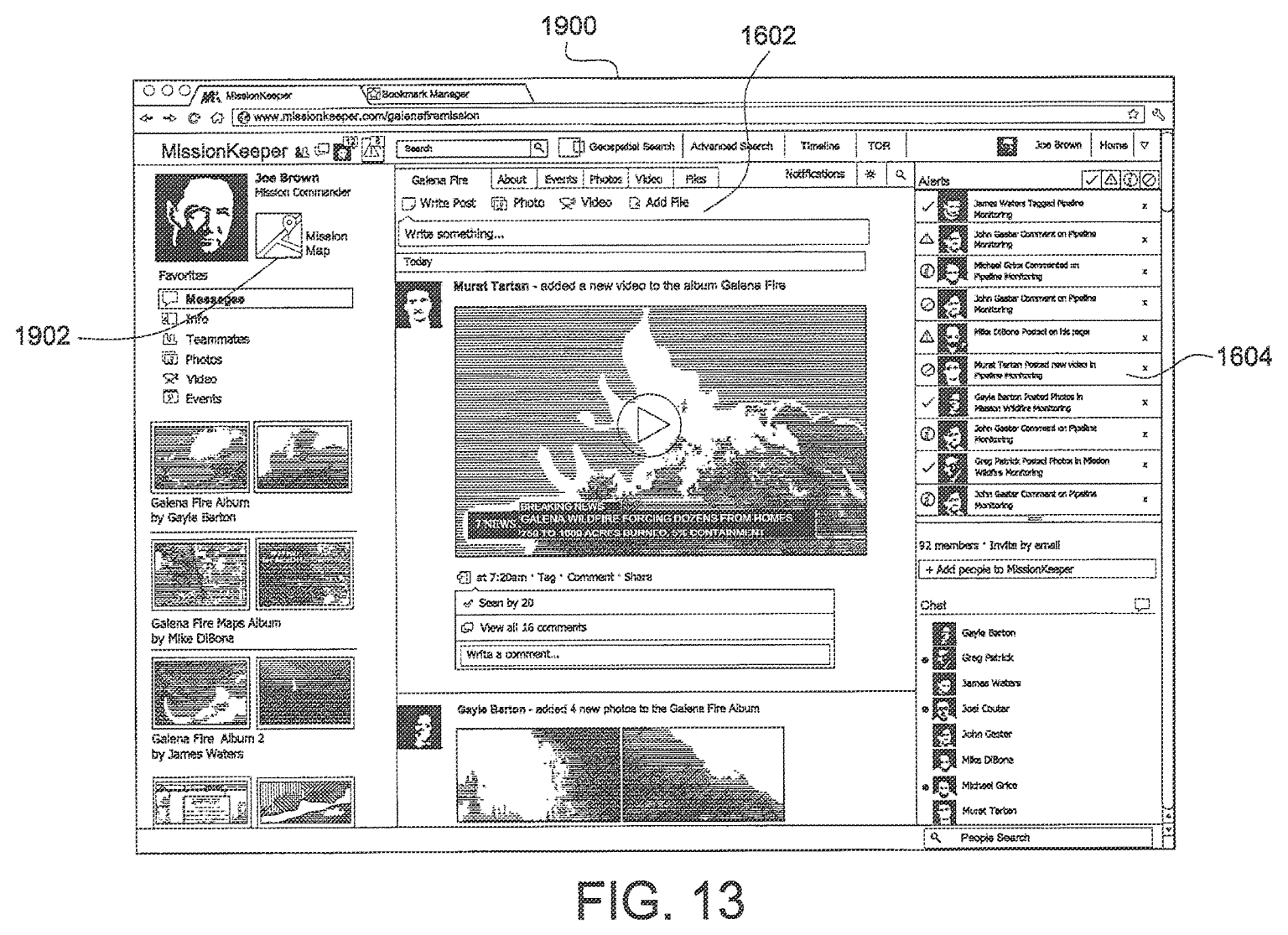

FIG. 13 is a screen-shot of the of the map imaging feature of the manager 350. In FIG. 13 there is also a timeline on center image (described below). Map imaging 1902 is also provided in the upper left corner of GUI 1602 which can be expanded. A team leader's page can also show different information than, for example, an environmental employee, which could be different from a mission commander page. For example, the mission commander could employ Wiki tools to help him or her build an instant report which gives the system and other users an important narrative to follow.

By clicking on a mission group 1706 (FIG. 11) the GUI 1602 displays a wall 1604 that is focused on one specific mission only, displaying to all of the participants' posts, updates and alerts. Video feeds are integrated directly into the wall view while other data comes from, for example, crowdsourcing, dropbox style document sharing or from other tagged content. As previously noted, the types of data that can get posted include imagery, video, tags and alerts, text files, word documents, excel spreadsheets and Powerpoint presentations.

Figure 14:
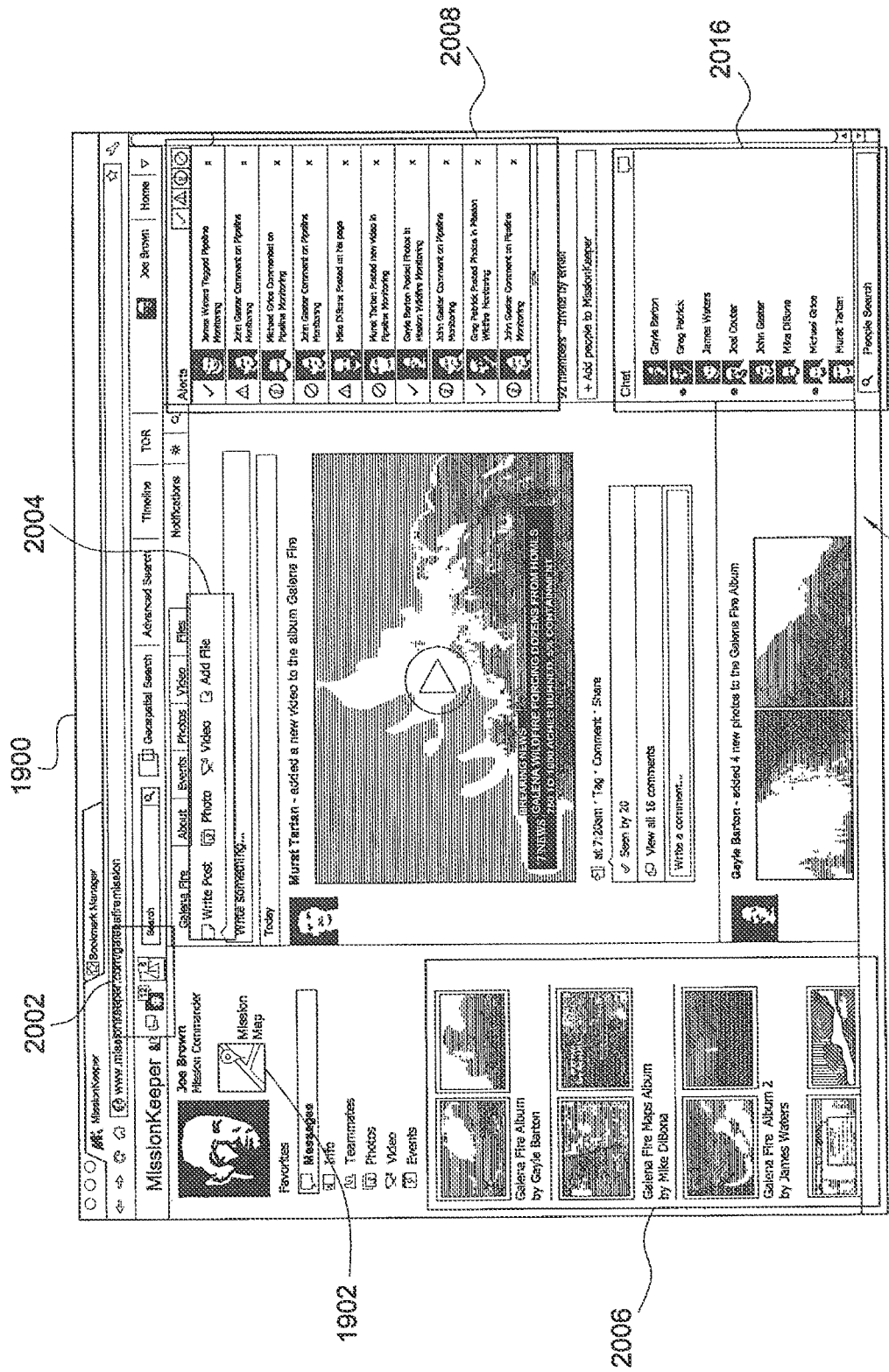
FIG. 14 is a graphic user interface screen shot of another mission's posts.

FIG. 14 is another view of the GUI 1602 for the Galena fire mission. As shown, alerts 2002 are posted from all missions, allowing an operator to turn to different missions quickly to monitor and manage new problems as they arise. Dropbox tools 2004 are also available which include video, document and external link integration. All files in this tool are indexed and represented geospatially on the map 1902. The lower left section of the GUI 2006 provides an album of the missions, containing all imagery and video linked to the mission.

The right side of the GUI 1602 changes when moving from the Events Wall 1604 to the Mission page 1900. Specifically the right side now displays Alerts 2008 and participant chats 2010 that are specific to the displayed mission.

Figure 15:
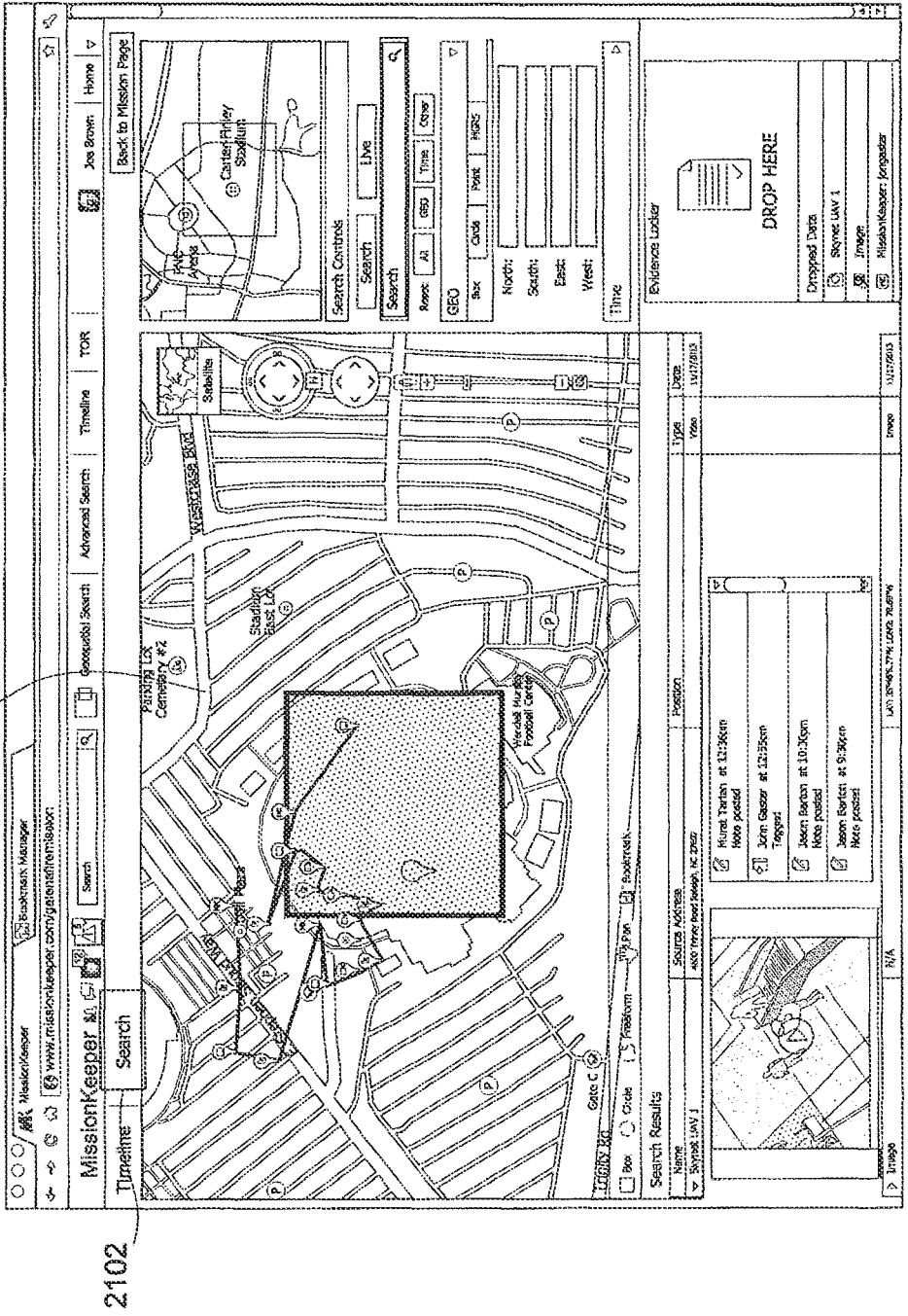
FIG. 15 is a graphic user interface screen shot of an expanded map illustrating search results.

FIG. 15 is a graphic user interface screen shot which shows expanded map 1902 which illustrates the results of a data search function 2102. In particular, the map search function relies on the user drawing a box on the screen. In one embodiment, the user uses a single finger to draw the box. Once the box is created, it is added to the wall for analysis.

Figure 16:
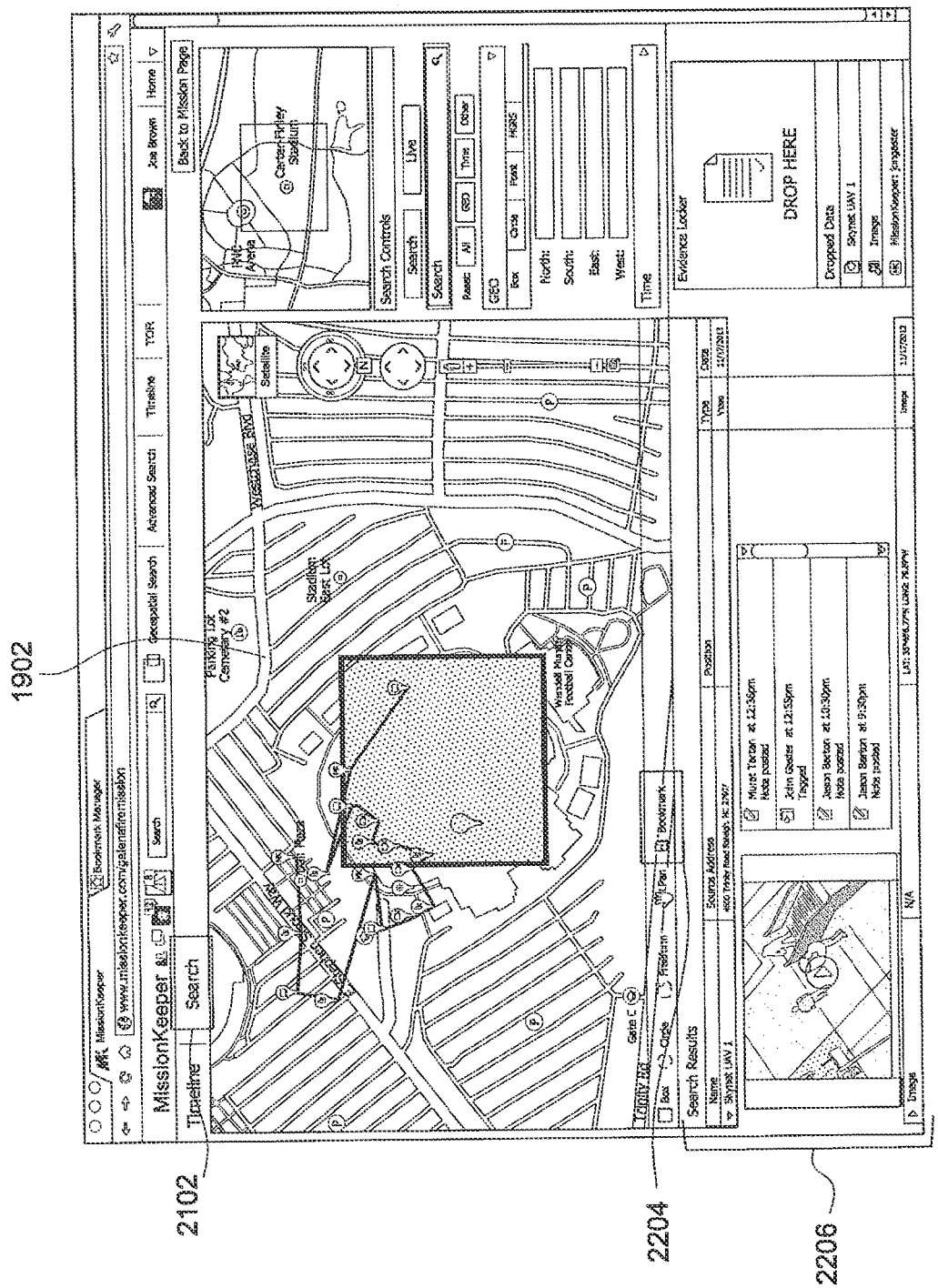
FIG. 16 is a graphic user interface screen shot of a user-drawn designated area on the map of FIG. 15.

FIG. 16 is a graphic user interface screen shot of a user drawn box of a designated area on the map 2202, which in this embodiment has been drawn over a Google earth map for a quick search. The drawn area can either be a box, a circle or a free-form area. The user can also bookmark 2204 the drawn area of interest and share the bookmark and/or receive alerts based on activities in the bookmarked area. The search results for the map area are displayed in 2206. The results listing includes the mission name, the video start and end times, the duration of the retrieved video and the data source platform.

Figure 17:
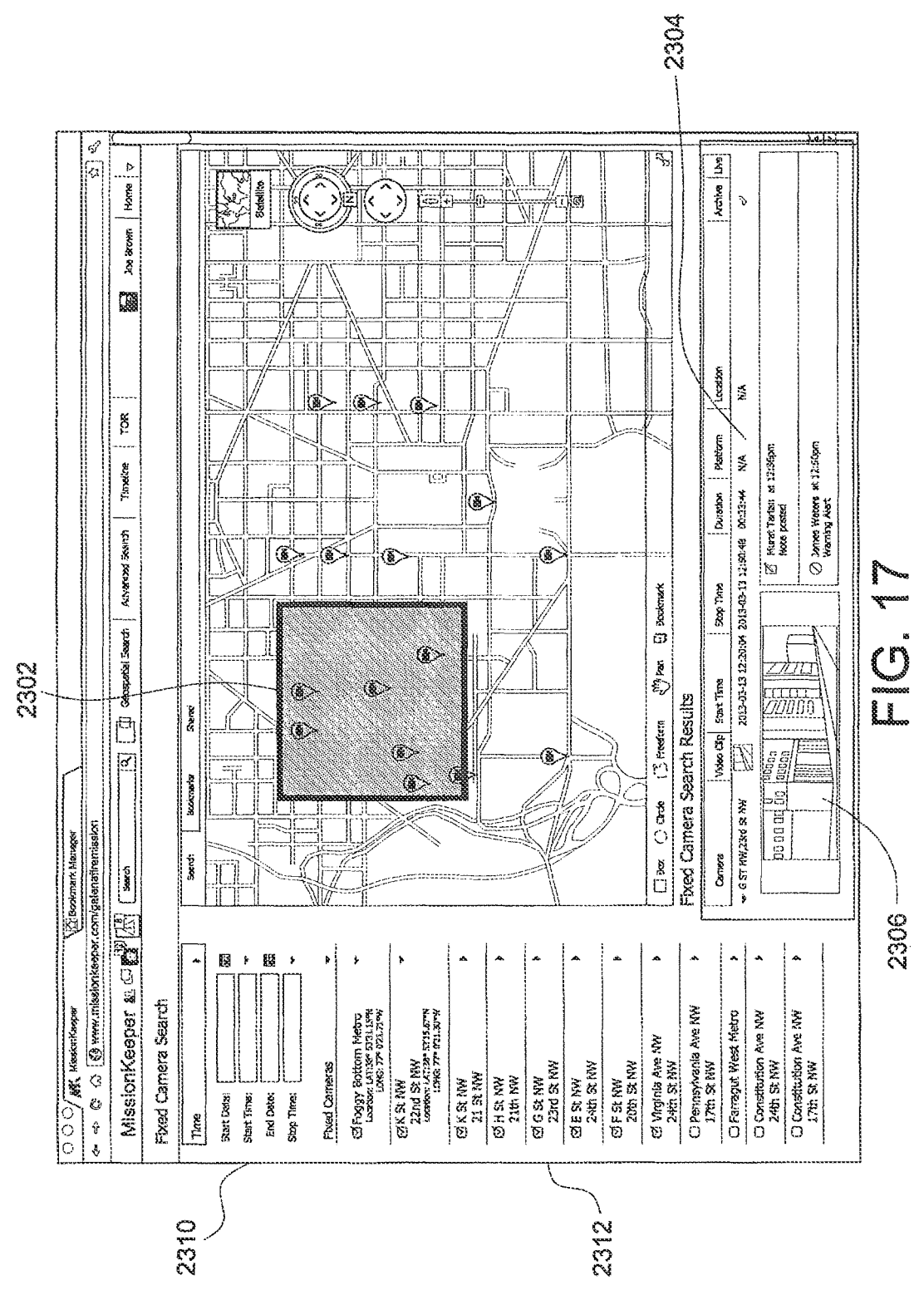

FIG. 17 is a graphic user interface screen shot of another map search of an urban area In this Figure, a map search is conducted for an urban area containing a number of fixed camera locations. The fixed cameras e.g. 2320 are illustrated on the map, including the searched area 2302. At the bottom of the GUI 1602, the search results are displayed in area 2304. However, unlike the exemplified Galena wildfire mission, the mapped area here involves data from many fixed surveillance cameras, which can be viewed as a video thumbnail in the search results section 2304. Moreover, the search results can be used to create a timeline of videos that match a day and time selected over the given area. The timeline functions will be further described in connection with FIGS. 26-28.

On the left side of GUI 1602, a search area 2310 is provided where the user can search by start and end dates and by start times and end times. A fixed camera search list 2312 is also provided for those cameras located in area 2302 whereby individual cameras can be selected/deselected from the search inquiry. Moreover, the analytics tools can be automatically deployed to plug in jurisdictional and data related laws and rules in order to sift through the data and remove those that violate those laws, or flag those data resources that require appropriate permissions for use.

Moreover, analytic tools can also be deployed to establish certain legal parameters or thresholds, such as establishing probable cause. Additional analytics can be utilized to search for focused information, like facial recognition, car licenses, or other available products or services.

Other forms of tagging tools can be used for bookmarked areas. Also, different users can tag different items in a bookmarked area, such as 2302. Finally, the bookmarked area is automatically updated and alerts are automatically generated when the status quo shifts, or when updated information becomes available. For example, heat alerts, water alerts, changed state alerts, even stains on ground alerts can be picked up, tagged and alerted by the system automatically.

Another aspect of the invention is that it can provide attributes for received information. For example, for fixed camera locations, the existing video feed may not contain associated telemetry—but that data is necessary in order to determine where cameras are located and even what they are filming from a flowed telemetry stream. The invention can therefore look at fixed points and insert coordinates into a faux telemetry stream which automatically infers the location.

Figure 18:
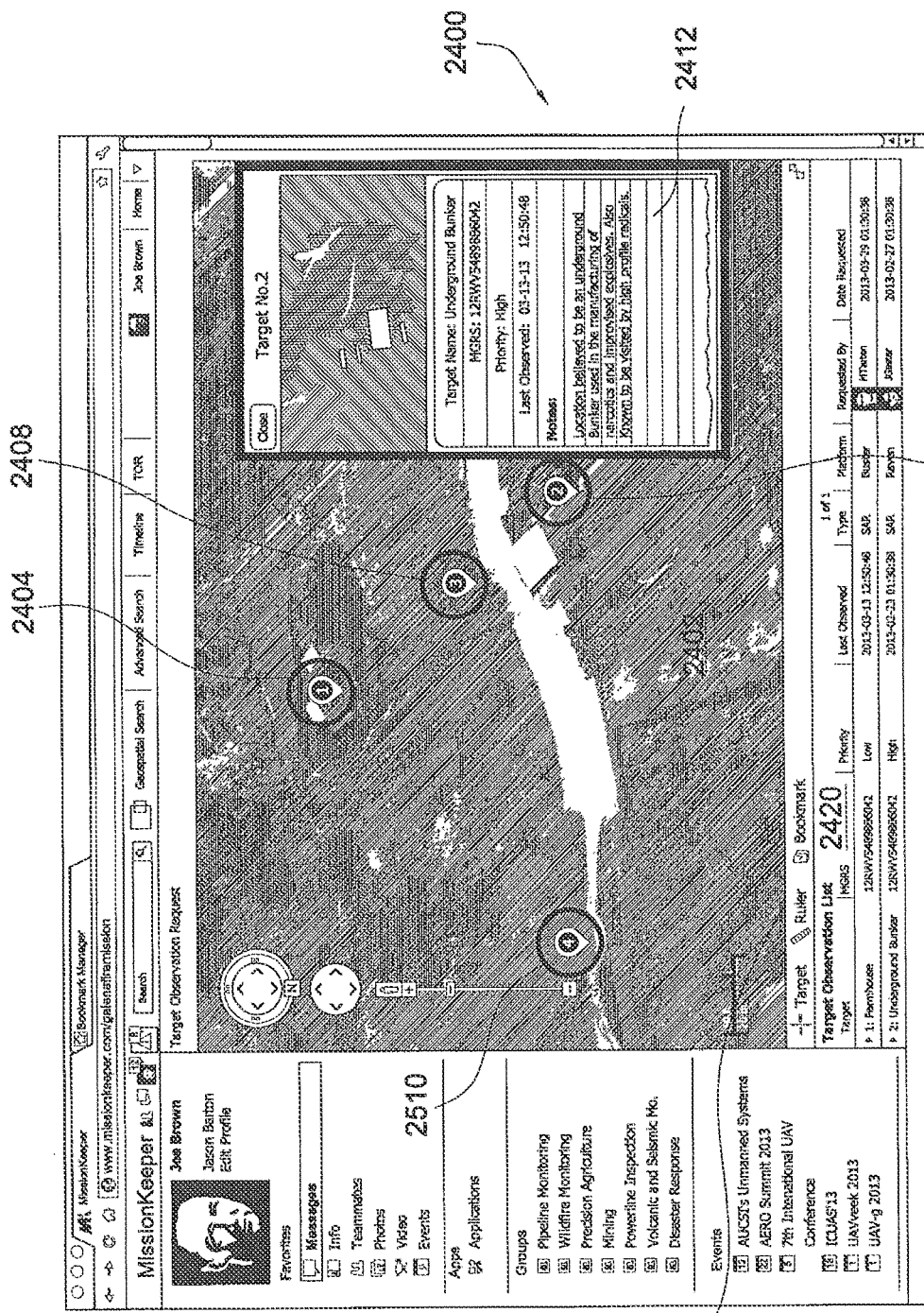
FIG. 18 is a graphic user interface screen shot of a target observation request (TOR) mission.

FIG. 18 is a graphic user interface screen shot of a target observation request (TOR) mission 2400. The value of a TOR is that it allows ordinality to be associated with an area under observation. For example, in the past, during hurricane Ike, pilots were given a list of one hundred twenty coordinates for each pilot to monitor. But the order of the points was random. So as a result, the pilots access to the fixed points was disorganized. At the end of the mission only sixteen of the fixed points were found, collectively. The TOR tool 2400 addresses this deficiency.

The TOR tool contains software targeting analytics where by clicking on a picture 2402 a target can be identified on the picture and assigned a priority 2404-2410. Coordinates will then be created for each selected target and sorted in a logical order. A note about each target 2412 can also be created to enable a user to judge its importance along with other targeting criteria. A target observation list 2420 is also created listing each target, its military grid reference system (MGRS), the time it was last observed, its priority, who has requested data for that specific target, and the date that the other observer's request was made to the system. The TOR function then generates an optimized flight plan and target checklist for the pilot which initiates a whole chain of custody process.

Figure 19:
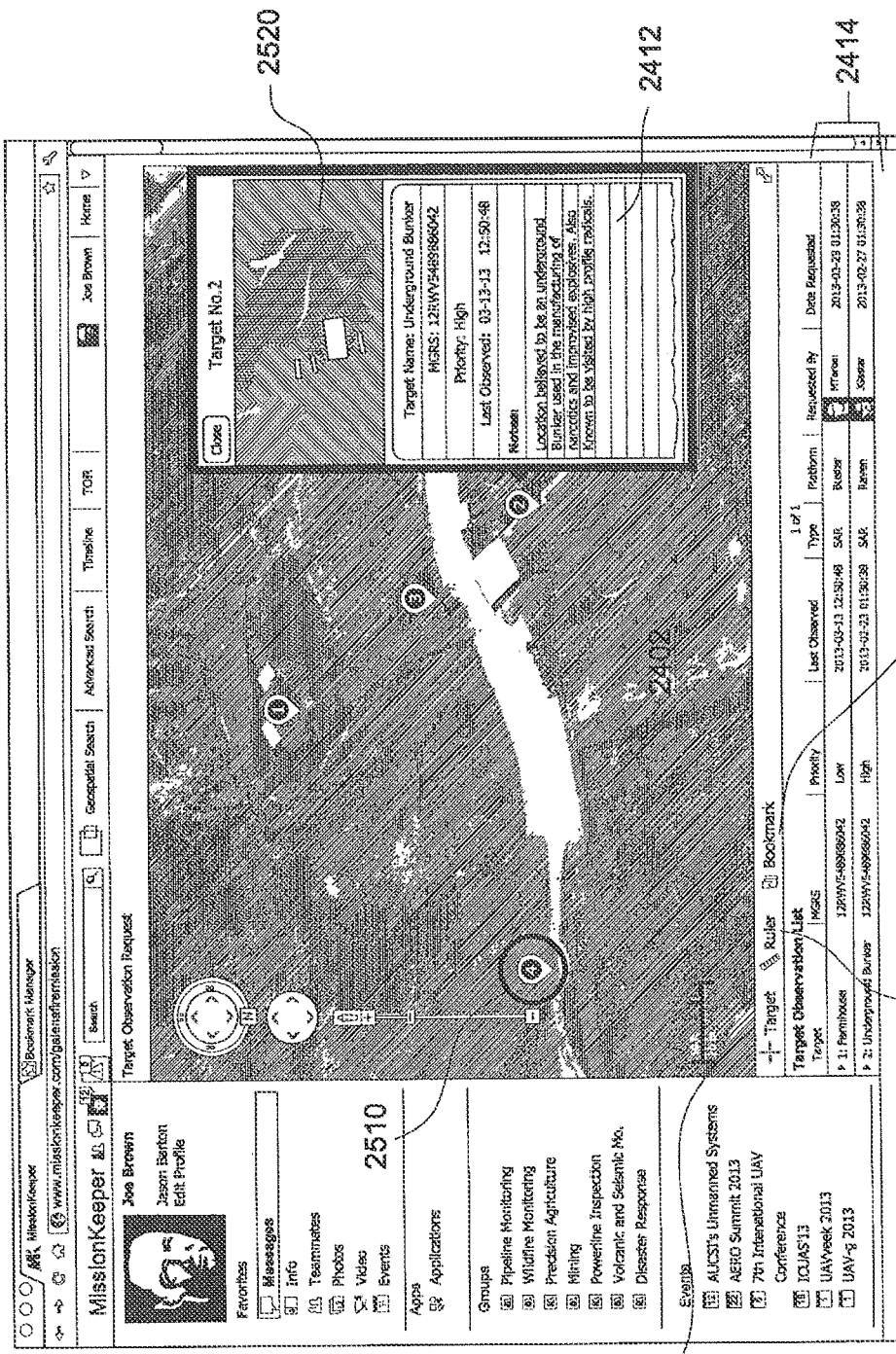
FIG. 19 is a graphic user interface screen shot depicting the TOR features in more detail.

FIG. 19 is a graphic user interface screen shot that depicts the TOR features in more detail. As noted, each target is identified with a target pin function 2510. A target observation tool 2512 activates that pin for an on-screen selected target. A ruler 2514 is then used to measure to geo-coordinates associated with the target which then provides information about that target for other uses, such as coordinates necessary for a UAV flight path. A target bookmark function 2516 operates similarly to the map bookmark in that once a bookmark is activated, the system will generate alerts any time the target is observed. The target requester notes 2412 includes a target image 2520 from the last time observed.

Figure 20:
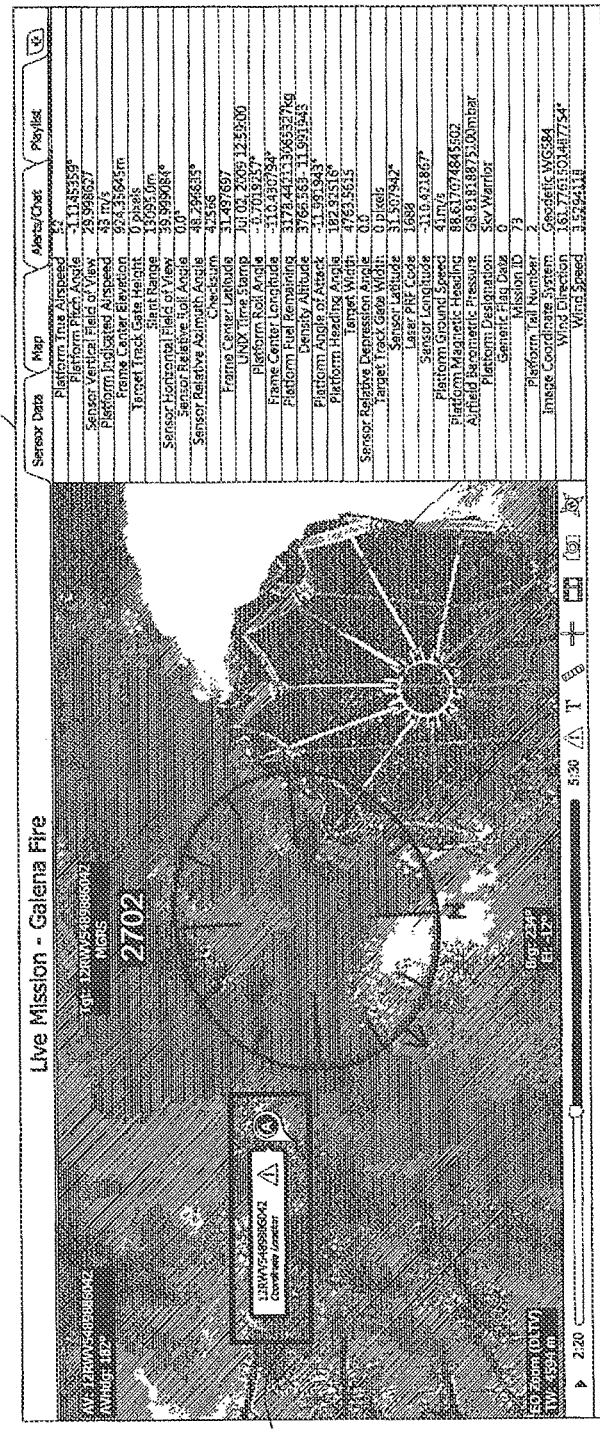
FIG. 20 is a graphic user interface screen shot that depicts the video player function of manager 350.

FIG. 20 is a graphic user interface screen-shot that depicts the video player function of the manager 350. As shown, the video player provides two functions. First, it generates alerts 2602 which in turn require a response. The system then monitors the alert response and can apply built-in rules to the response, or lack thereof. Second, is the Tag function 2602. For example, a tag is needed over a mapped area in order to create a flame retardant drop site. For example, the tagged locale 2602 can be a firefighter observer who is chatting with the operator who is in turn planning to drop the fire retardant. The tagged location is essential not only to avoid dropping retardant on the firefighter, but also for providing on-ground communications and observations. The sensor data tab 2610 provides the user with data relating to the video source so that it can be assessed.

Figure 21:
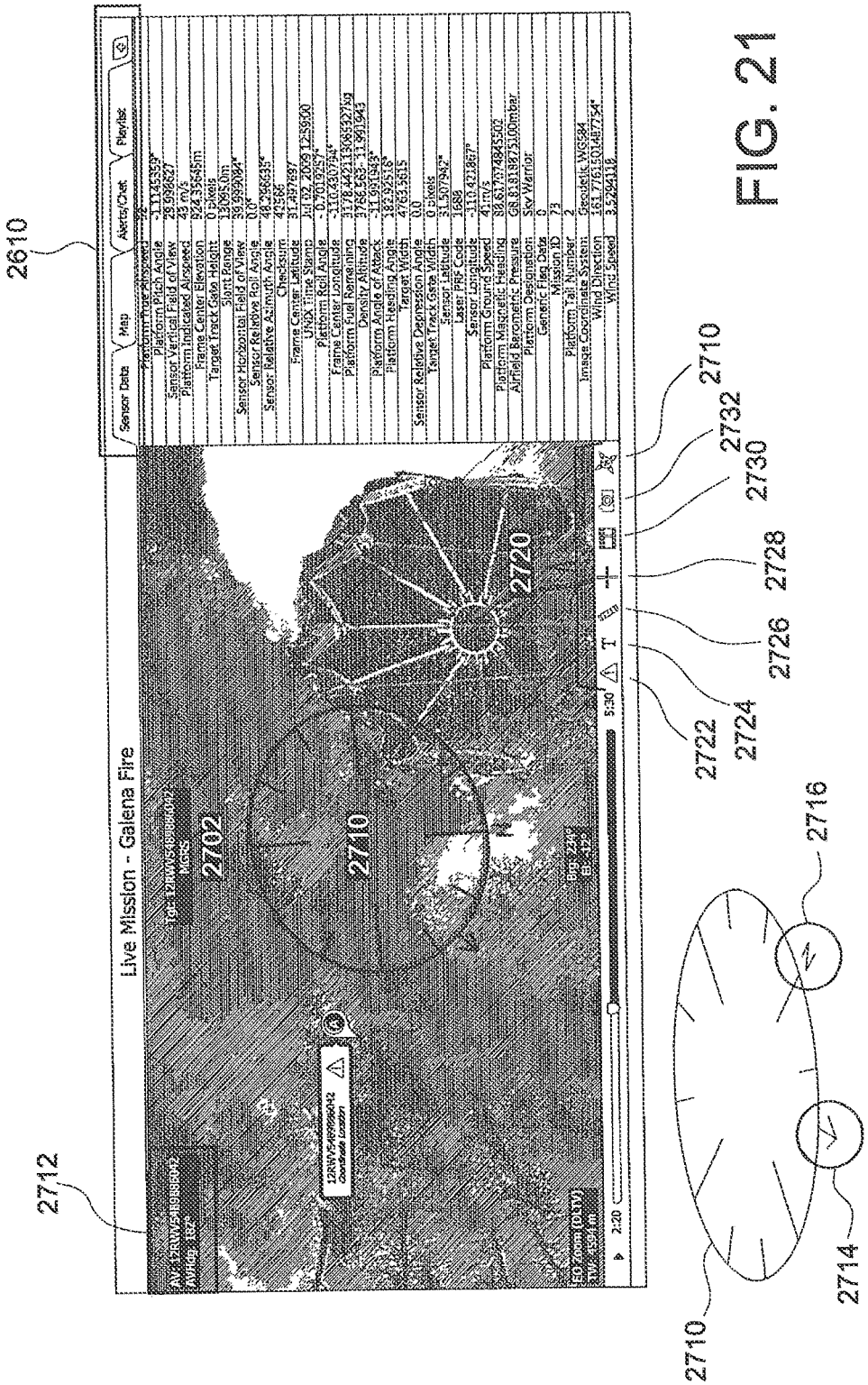
FIG. 21 is a graphic user interface screen shot of the detailed operations of the sensor tab.

FIG. 21 is a graphic user interface screen shot of the detailed operations of the sensor tab (which is customizable). The video image display portion 2702 incorporates non-destructive text overlays 2712 to assist the operator in monitoring the targeting operations. For example, a compass rose 2710 is placed over a desired target area with related compass elements (such as a direction of flight indicator 2714 and the true north direction 2716). A video player toolbar 2720 is also available. Toolbar functions include an alert generator 2722 with geospatial coordinates, text overlays with an on/off switch 2724, and a ruler function 2726, which measures the distance between two points. Tool 2728 is designed to generate geospatial tags, and tools 2730 and 2732 generate a video clip or camera snapshot respectively (both are geo-tagged).

It should be noted that the manager 350 adds a layer of time-coding to image data timed to the millisecond so that it can be re-assembled later. The system 350 is designed to tie in chat with time stamp telemetry. As a result, and operator can stripe time code across the entire system.

Figure 22:
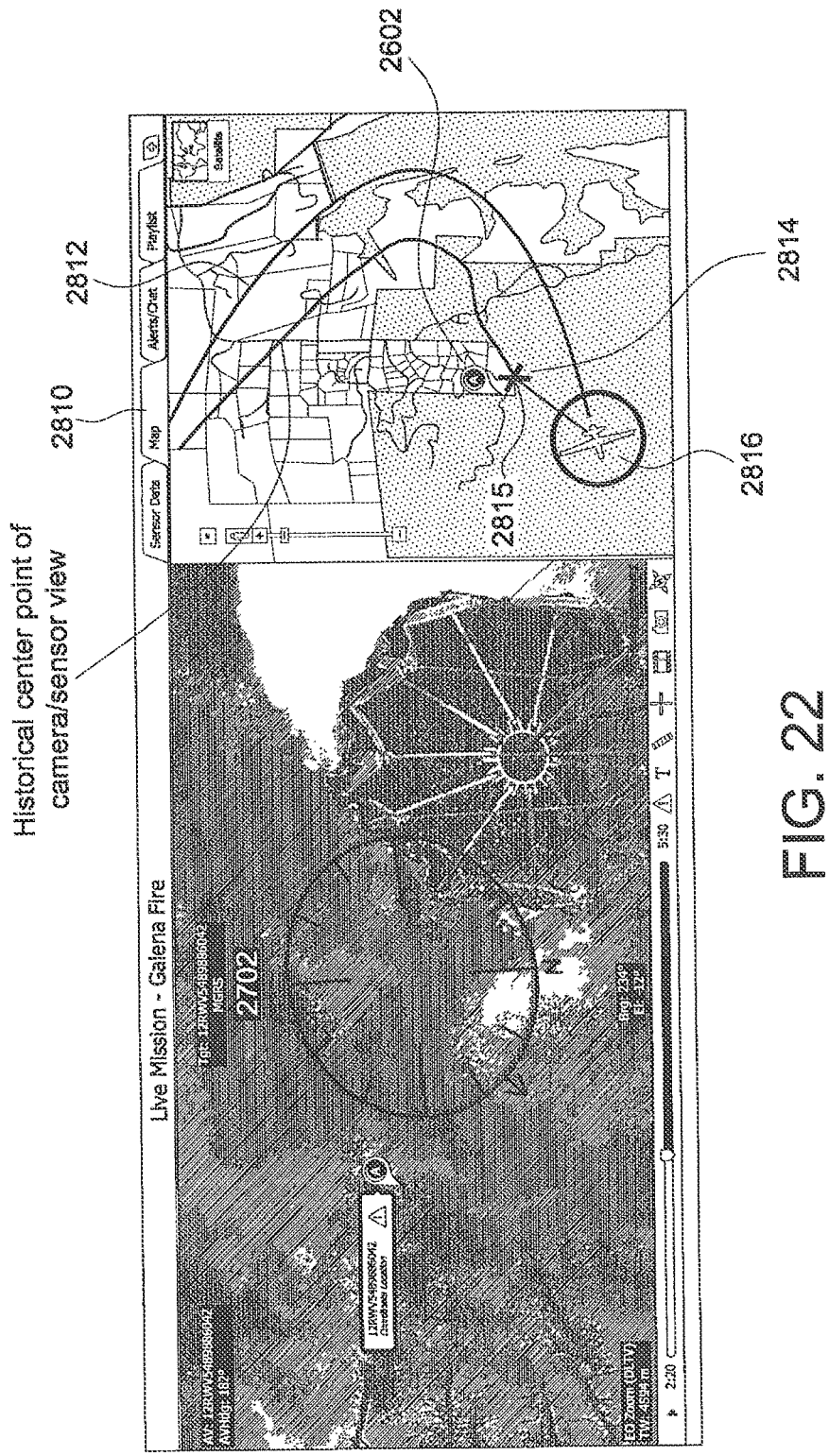
FIG. 22 is a graphic user interface screen shot of the map tab function.

FIG. 22 is a graphic user interface screen shot of the map tab function. The map tab 2810 is shown next to the video screen 2702. In this embodiment, the map tab shows the flight path 2812, the drop target site 2815 and the present position of the sensor (e.g. current center point of camera/sensor view) 2814. The location of the alert source 2602 is also shown adjacent to the target site.

Figure 23:
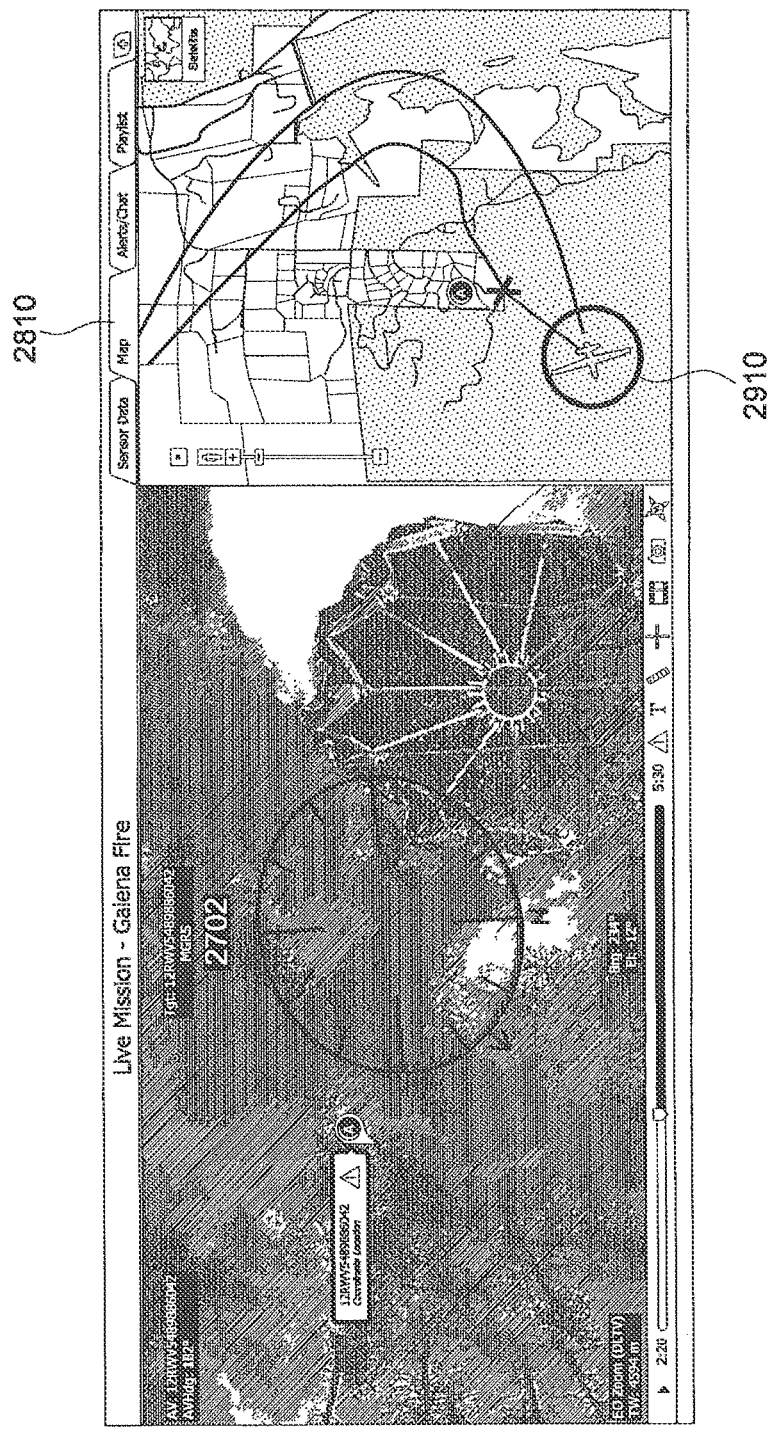
FIG. 23 is a graphic user interface screen shot showing further operations of the map tab function.

FIG. 23 is a graphic user interface screen shot showing further operations of the map tab 2810 function. 2810 includes information regarding the slant angle 2910 of the UAV mounted sensor/camera responsible for the video presented in screen portion 2702.

Figure 24:
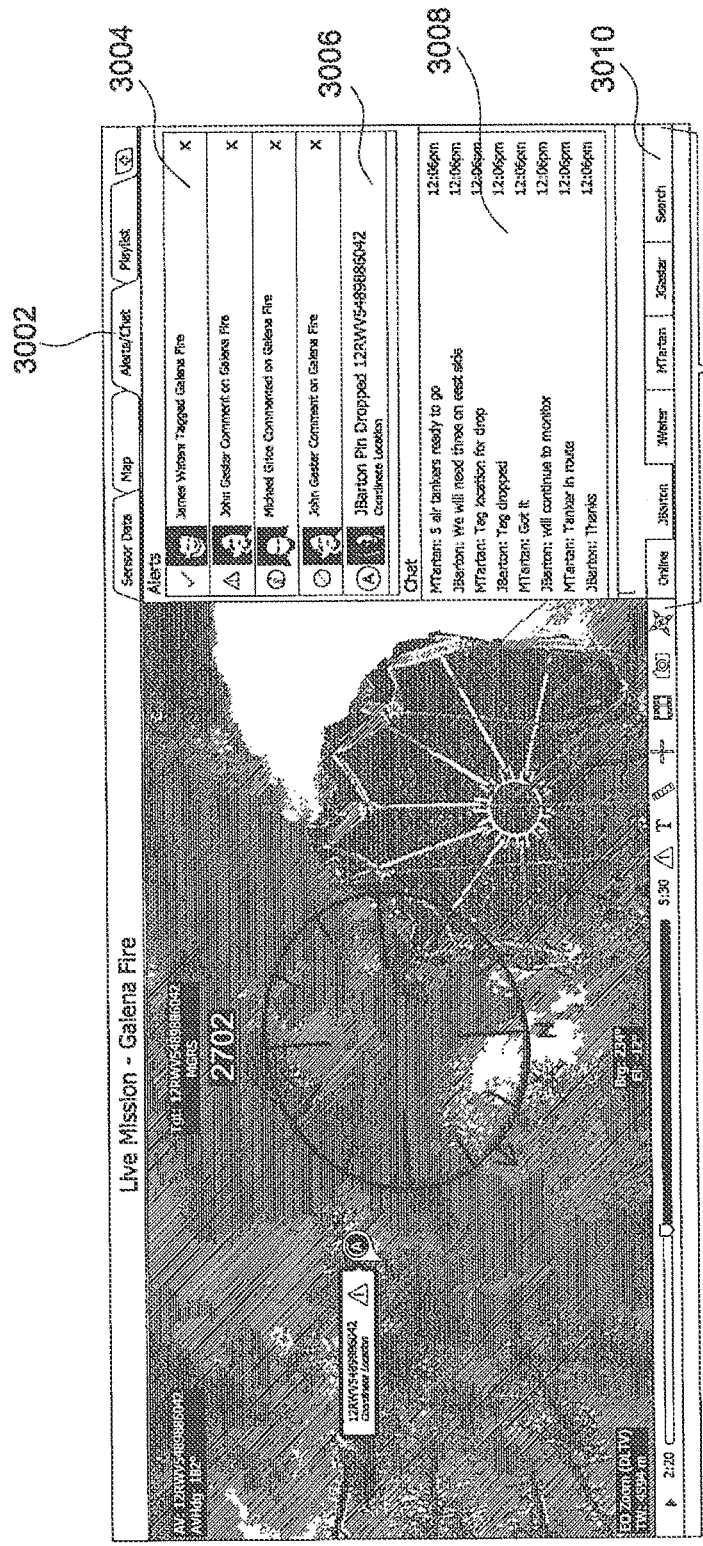
FIG. 24 is a graphic user interface screen shot of the Alert/Chat tab function.

FIG. 24 is a graphic user interface screen shot of the Alert/Chat tab 3002 functions of the video player GUI. The Alerts window 3004 lists any alerts generated by predetermined keyword preferences pushed by another user. The list includes the alert pin 3006 which is geocoded on the video image 2702. The chat window 3008 provides a chain of custody record since it is synchronized to the video by time and location and is fully searchable 3010 by those accessing the system. Name tabs 3012 allow a user to view only those chats posted by identified users and also gives an instant view of all users who have accessed the marked location data.

Figure 25:
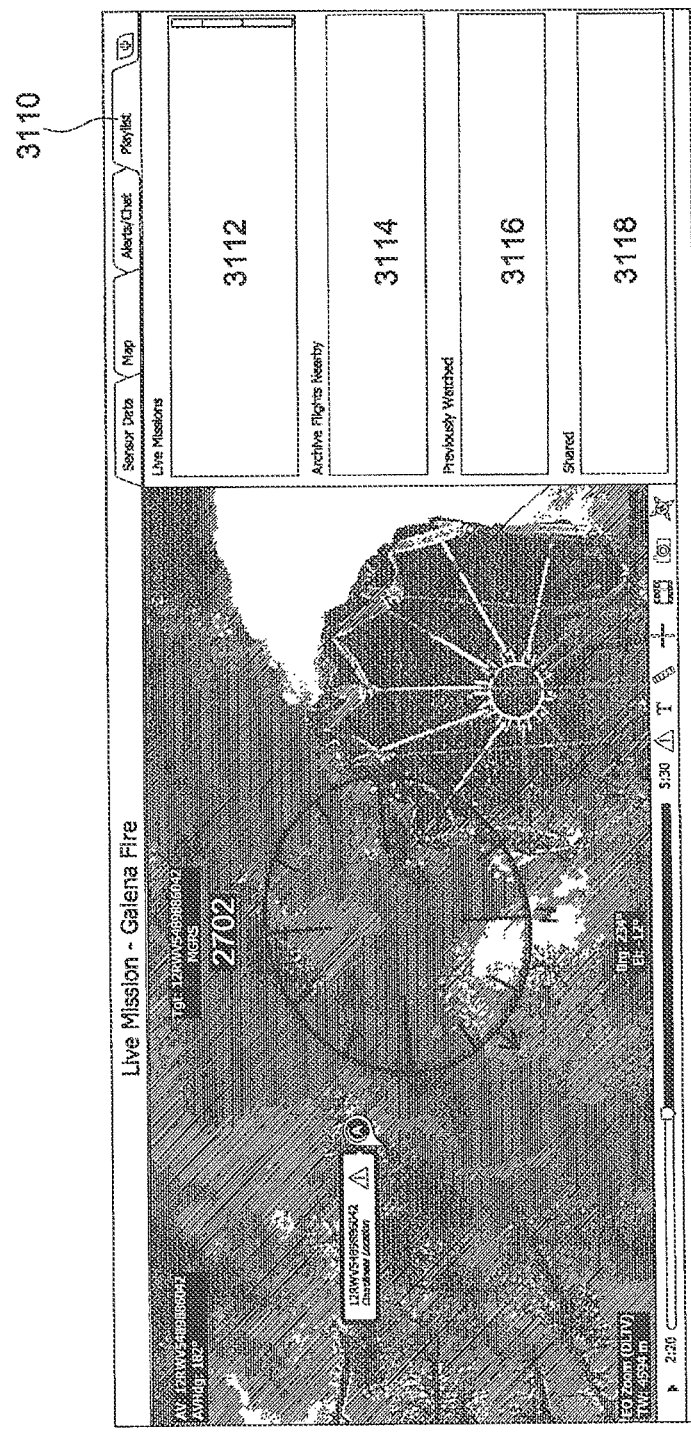
FIG. 25 is a graphic user interface screen shot of the video player play list tab function.

FIG. 25 is a graphic user interface screen shot of the video player playlist tab 3110 function. This tab works as the camera is moving and the system can infer coordinates. This tab 3110 enables a user to insert rules and time information with other live data. The live missions column 3112 lists any live videos or other imagery data away from the core point of interest but in the same geospatial area. Those data can include twitter pix, aircraft video, news feed, etc. This area functions in a manner that is similar to a live television channel guide.

The archive missions column 3114 pulls up columns of archival data arranged by closeness to the target area. The previously watched column 3116 includes any video bookmarked or watched previously. Finally, the shared window area 3118 incorporates video that has been recommended for the user to watch. For example, there may be a fixed camera view from further away or an infrared version of the video or even raw sensor data, such as where there is the presence of hydrocarbons in the area of interest.

Another feature of the invention not illustrated is the report button. The button could be a Wiki which generates a PowerPoint to provide information. A user, such as a project manager, could create their own report. Radio buttons could allow the user to customize reports.

FIG. 26 is a graphic user interface screen shot of the manager timeline function; As shown, the Search capability (shown for example in FIG. 17) 3206 can also include a timeline function. This function enables a user to construct a timeline based on selected images/videos taken from the bookmarked map area. As shown, images/video that are of interest during a selected time-slice are dragged into a search results list. Moreover, those images are stored in an evidence locker area 3202. There items are then copied if not already, stored in the system and flagged as special, then made available for analytic processing by the integrated server/CDN 354. An analytic tool 3204 is then run on the information in the evidence locker 3202 to apply the relevant laws and rules pertaining to the selected data. As shown, the list 3214 shows all items dropped into the evidence locker 3202. These rules are run with the particular purpose of establishing usable evidence to support important legal requirements, like establishing probable cause to support a search warrant or an arrest.

Figure 27:
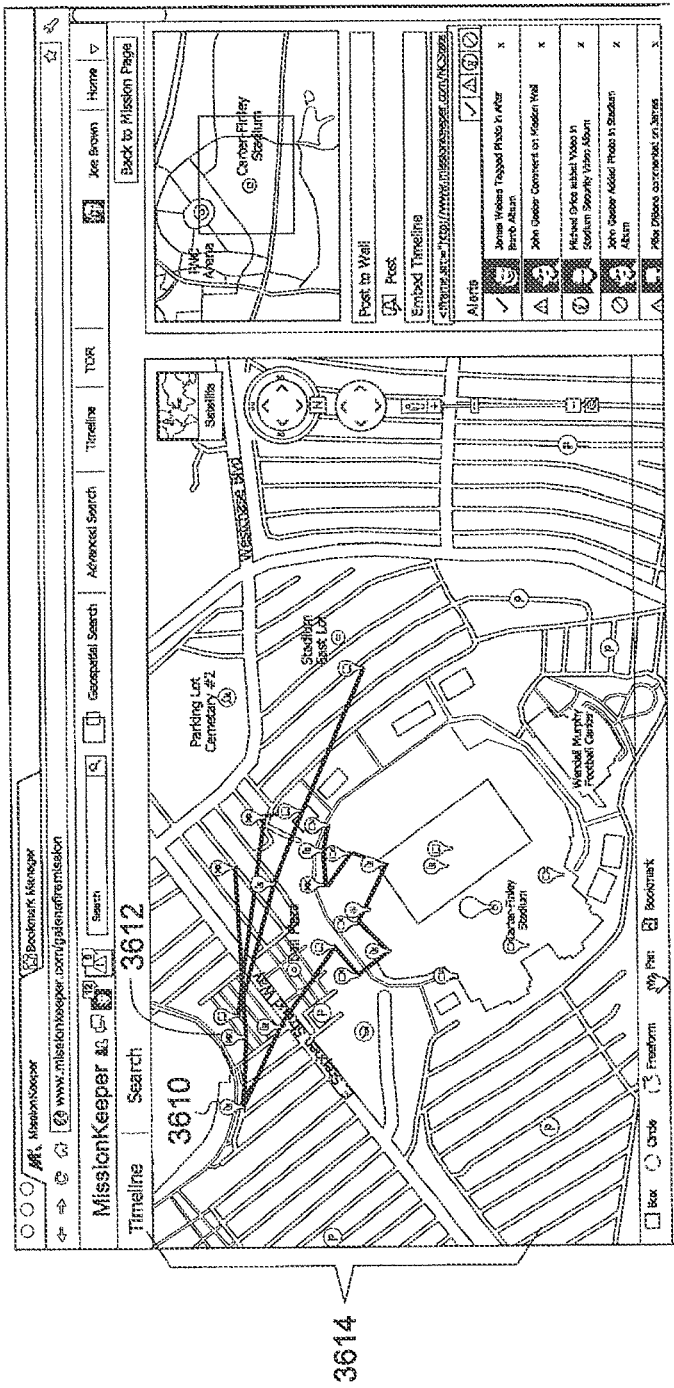
FIG. 27 is a graphic user interface screen shot of the constructed timeline graph.
Figure 28:
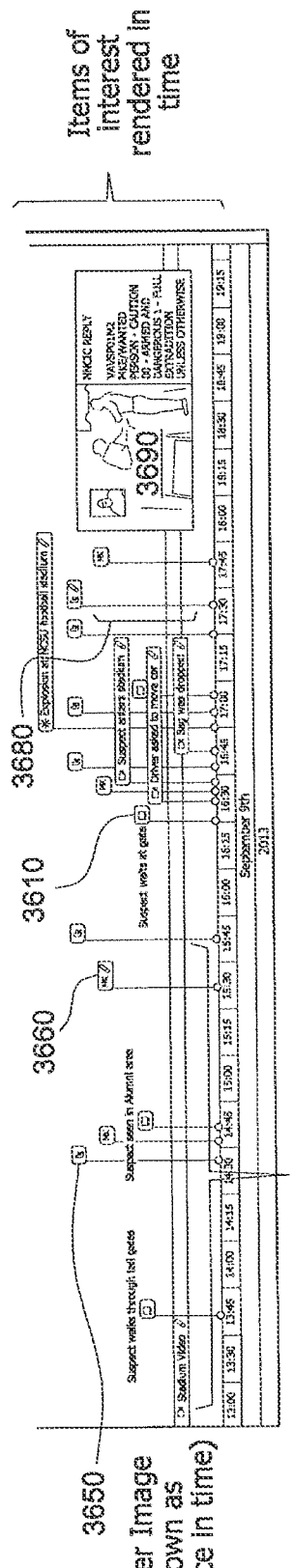
FIG. 28 is a graphic user interface screen shot of images from the evidence locker placed on a time sequenced map.

FIGS. 27 & 28 are graphic user interface screen shots of the map and the constructed timeline graph. In use, the user drags their mouse or cursor on the map highlights 3610, 3612 rendered by location 3614. Dragging the mouse/cursor over the tags 3610 et seq. highlights the corresponding event 3610 in the timeline 3620 and vice versa. As shown in FIG. 28 each piece of data is plotted against a time graph, with the incident of interest 3610 located at the center Those images can reflect all data types, including Twitter images 3650. The paperclip icon 3660 on the timeline 3620 means an analytic tool processed the data and tied the analytic results to the original video/image. The vertical axis 3680 represents physical distance from the incident, while the horizontal axis 3620 pertains to time differences before and after the incident of interest, which is in turn located at the center-point of the display. Clicking on a tag in the timeline shows any analytic results and associated video/imaged 3690.

The images from the evidence locker have passed the law analytics test, placed on a map in a time sequenced fashion, providing a likely path of images that are time-stamped and geo-coordinated along with audit trail information referenced in the evidence locker. The timeline thus becomes a data mining engine for the appropriate incident based application.

Figure 29:
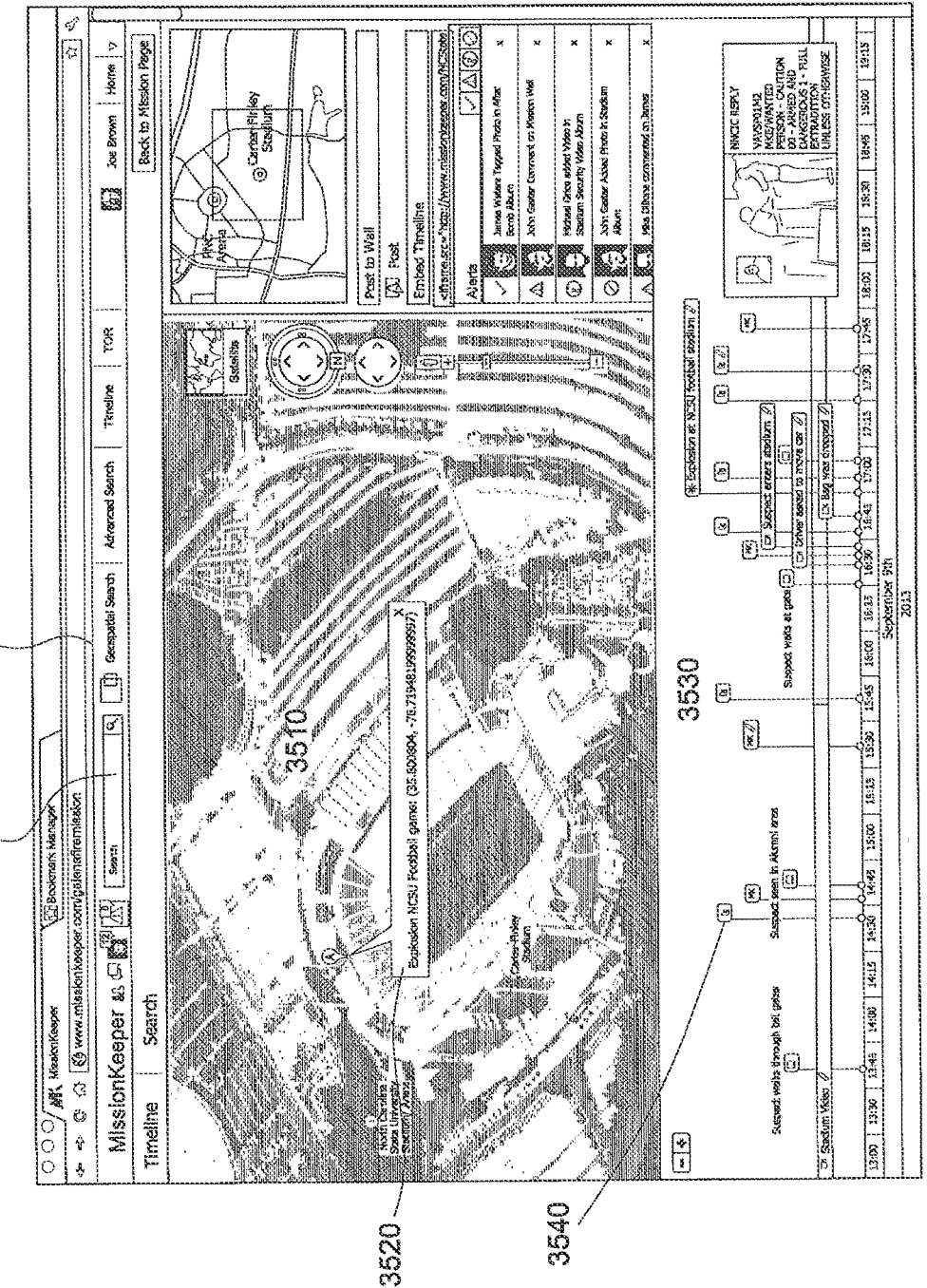
FIG. 29 is a graphic user interface screen shot of the timeline function exemplified to a staged explosion.
Figure 30:
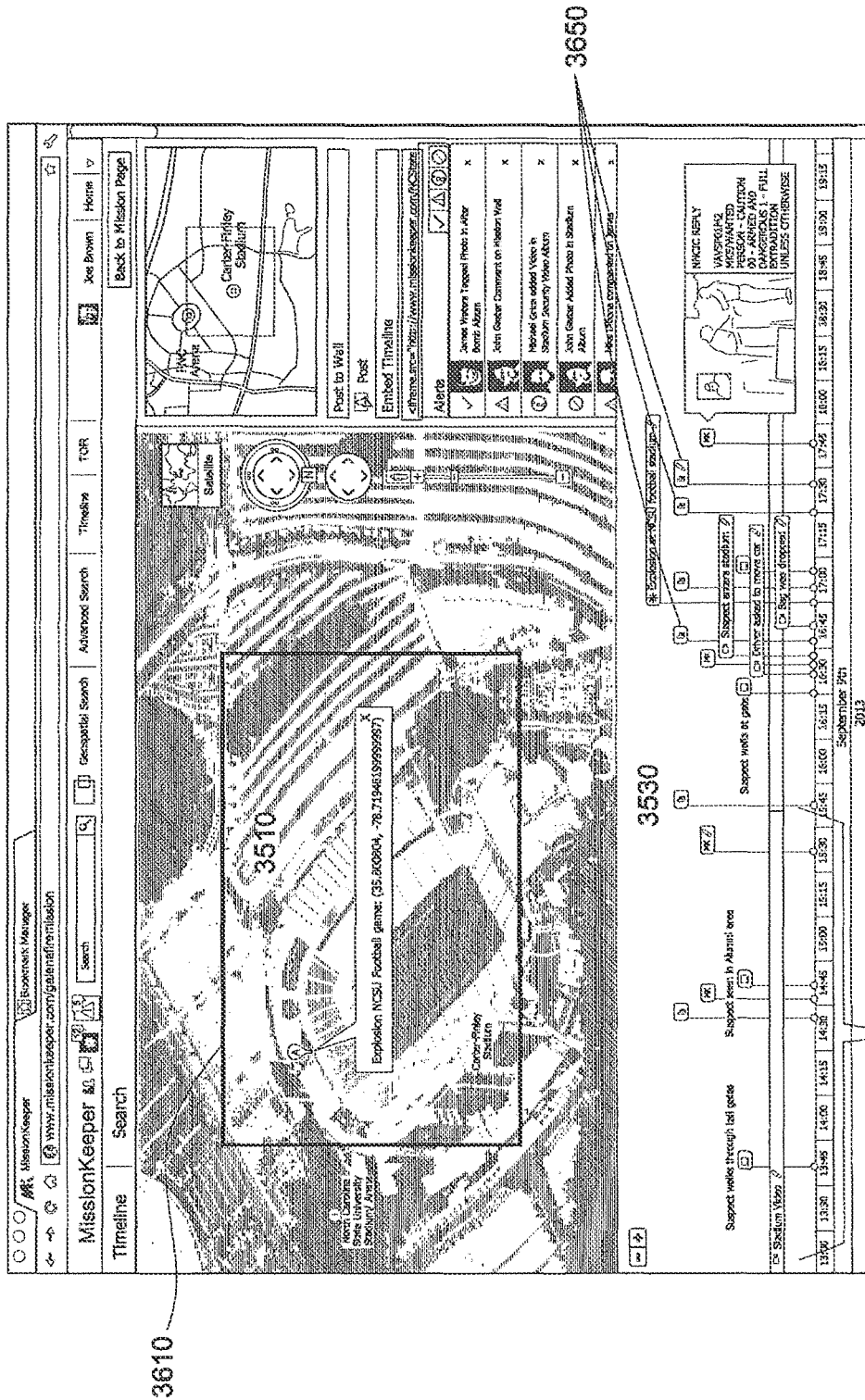
FIG. 30 is a graphic user interface screen shot of a more detailed timeline function.

In summary, the timeline function involves dragging an image, freeze-framing the image, then, dragging it into the evidence box, automatically creating an image icon, placing the icon on a timeline and sharing that timeline with anyone else who has access to the timeline mapping. The timelined image references are then mapped to determine the suspect's path of movement. FIG. 29 is a graphic user interface screen shot of the timeline function exemplified to a staged explosion in a football stadium. On the GUI 1602, the wall displays identified video and imagery. A map 3510 is also displayed showing the football stadium with a tag for the time and location of the fictional explosion 3520. As illustrated in FIG. 30, a box 3610 is then drawn on the map 3510, and time and date search parameters are entered into search box 3550. A return list of the search results are then displayed below the map 3530. The user then peruses the results for a result of interest, and after clicking on the results of interest, an artifact pops up or plays in a box to the right of the results list (not shown). A check box will also appear next to the displayed artifact which allows the user to identify an interest. As soon as the box is clicked, the artifact (which can be a photo, a video, a document or other information) is snapped onto the timeline 3530 and is rendered on the map. The timeline becomes available for viewing when the user toggles to the timeline view mode (not shown). As a consequence, the elements in the timeline will be rendered over the map to show both the location of the event and a pattern-of-life which tracks the items across location and time.

Once a selected item has been moved from the search results to the timeline 3530, probable cause has been established and the video/image or other identified data becomes part of the evidence locker, available for use with various connected analytic tools from further data mining and processing. Results from the processed data are tagged and are bound to the video/imagery and are represented by an icon 3540 on the timeline 3530.

FIG. 30 is a graphic user interface screen shot of images from the evidence locker placed on a time sequenced map 3530. Images and videos are shown differently on the timeline. Video(s) 3620, for example, is shown with duration across the timeline 3530, while photos 3650 are represented as an instant in time, reflecting the moment the photo was taken. Paperclip or notepad icons are also shown on the video or image to indicate that it has either been tagged manually (notepad), or tagged through an analytic tool (paperclip). The timeline displayed items are also drawn on the map (as shown in FIG. 28) and a line will be drawn from event to event from start to end.

Although the invention has been described with reference to certain-embodiments, it will be understood that the invention is not limited to the details thereof. Various substitutions and modifications have been suggested in the foregoing description, and others will occur to those of ordinary skill in the art. All such substitutions and modifications are intended to be embraced within the scope of the invention as defined in the appended claims.

What is claimed as new and desired to be protected by Letters Patent of the United States is:

1. An unmanned aerial vehicle (UAV) management system, comprising:
   an integrated server configured to receive at least one data stream from at least one UAV and to deliver the at least one data stream to at least one user device, said at least one data stream including therein geospatial data; and
   at least one user device having a display, each said at least one user device being operated by a respective user and configured to receive the at least one data stream from the integrated server, to display a map on the display and allow identification of a bookmarked area of the map by the user based on said geospatial data received from said at least one data stream,
   wherein the integrated server is configured to automatically provide alerts to the at least one user device if a location associated with the at least one data stream is located within the bookmarked area,
   wherein the integrated server is configured to provide geospatial data, responsive to a search by the respective user of said geospatial data received and other geospatial data stored, for display on said display, and
   wherein the integrated server comprises a data manager configured to allow another user to tag an item in the bookmarked area.

2. The UAV management system according to claim 1, wherein the at least one data stream comprises at least one selected from the group of video, telemetry and GPS.

3. The UAV management system according to claim 1, wherein the integrated server comprises a cloud.

4. The UAV management system according to claim 1, wherein the integrated server comprises a ground station.

5. The UAV management system according to claim 1, wherein the at least one user device is a ground station.

6. The UAV management system according to claim 1, wherein the data manager is configured to create model instances necessary to provide the alerts.

7. The UAV management system according to claim 6, wherein the data manager is configured to allow the user to share the bookmarked area with another user.

8. The UAV management system according to claim 6, wherein the data manager is configured to allow the at least one user to tag an item in the bookmarked area.

9. The UAV management system according to claim 6, wherein the integrated server further comprises;
   a collaboration tool configured to provide an informed decision loop for the user that is coordinated by the data manager; and
   a user authenticator configured to enable transmission of UAV data and receive communications from authenticated resources.

10. The UAV management system according to claim 9, wherein the informed decision loop further comprises a posting function in order to post alerts to multiple collaborators in the decision loop or alert a UAV asset connected to the decision loop.

11. The UAV management system according to claim 1, wherein the at least one user device is configured to construct and display a timeline based on selected events, images, and/or videos having associated therewith a location within the map on the display and to simultaneously display a plurality of the selected events, images and/or videos on the map and the timeline, and to indicate if analytic processing has been performed on the images and/or videos.

12. The UAV management system according to claim 1, wherein the alerts indicate a status quo shift or that updated information is available.

13. The UAV management system according to claim 1, wherein the alerts compromise at least one selected from heat alerts, water alerts, and stains on ground alerts.

14. The UAV management system according to claim 1, wherein the bookmark is a user drawn shape, and the shape is one selected from the group of box, circle and free-form area.

15. The UAV management system according to claim 1, wherein the at least one data stream comprises at least one slant angle of a sensor on the UAV and a geospatial coordinate of the sensor.

16. A method for utilizing aerial vehicle data for an unmanned aerial vehicle (UAV), the method comprising:
    receiving at least one UAV data stream at a user device, said at least one UAV data stream including therein geospatial data;
    displaying a map on the user device based on said geospatial data received;
    receiving at the user device an identification of a bookmarked area of the map based on said geospatial data received;
    automatically receiving alerts at the user device if a location associated with the at least one UAV data stream is located within the bookmarked area,
    wherein said displaying said geospatial data on said map comprises, responsive to a search by the respective user of said geospatial data received and other geospatial data stored, displaying results of the search of said geospatial data received and other geospatial data stored on said display; and
    allowing another user to tag an item in the bookmarked area.

17. The method according to claim 16, wherein the alerts are received at the user device from the UAV.

18. The method according to claim 16, wherein the alerts are received at the user device from an integrated server that received the alerts from the UAV.

19. A method for utilizing aerial vehicle data for an unmanned aerial vehicle (UAV), the method comprising:
    providing at least one UAV data stream at a user device, said at least one UAV data stream including geospatial data;
    receiving from the user device an identification of a bookmarked area of a map based on said geospatial data received;
    automatically providing alerts to the user device if a location associated with the at least one UAV data stream is located within the bookmarked area,
    wherein said alert to the user comprises said geospatial data received and other stored geospatial data; and
    allowing another user to tag an item in the bookmarked area.

20. The method according to claim 19, wherein the alerts are provided to the user device from the cloud.

21. The UAV management system according to claim 15, wherein the sensor is a camera.

22. The UAV management system according to of claim 15, wherein the location is a determined location based on the at least one slant angle.

23. The UAV management system according to claim 15, wherein the location has an alert location offset from the geospatial coordinate of the sensor.

* * * * *